(12) United States Patent
Tahan

(10) Patent No.: US 9,459,825 B2
(45) Date of Patent: Oct. 4, 2016

(54) SYSTEMS AND METHODS FOR HIGH-RESOLUTION IMAGE VIEWING

(71) Applicant: Opus Medicus, Inc., San Diego, CA (US)

(72) Inventor: Thomas Tahan, La Jolla, CA (US)

(73) Assignee: Opus Medicus, Inc., La Jolla, CA (US)

( * ) Notice: Subject to any disclaimer, the term of this patent is extended or adjusted under 35 U.S.C. 154(b) by 114 days.

(21) Appl. No.: 14/469,315

(22) Filed: Aug. 26, 2014

(65) Prior Publication Data

US 2015/0070357 A1    Mar. 12, 2015

Related U.S. Application Data

(60) Provisional application No. 61/875,278, filed on Sep. 9, 2013.

(51) Int. Cl.
| | |
|---|---|
| *G06T 5/00* | (2006.01) |
| *G06F 3/14* | (2006.01) |
| *H04N 21/2343* | (2011.01) |
| *H04N 21/4728* | (2011.01) |

(52) U.S. Cl.
CPC ....... *G06F 3/14* (2013.01); *G06F 2203/04806* (2013.01); *G09G 2340/045* (2013.01); *G09G 2340/0407* (2013.01); *G09G 2340/12* (2013.01); *H04N 21/234327* (2013.01); *H04N 21/4728* (2013.01)

(58) Field of Classification Search
CPC . G06F 3/0481; G06T 3/4007; G06T 3/4084; G09G 5/391; G09G 2340/0414; G09G 2340/0407; G09G 5/006; G09G 2340/0421
See application file for complete search history.

(56) References Cited

U.S. PATENT DOCUMENTS

| | | | | |
|---|---|---|---|---|
| 7,991,837 | B1 * | 8/2011 | Tahan | G06F 3/0481 348/240.3 |
| 2006/0061570 | A1 * | 3/2006 | Cheryauka | G06T 11/006 345/424 |
| 2010/0128983 | A1 * | 5/2010 | Sugai | G06K 9/3216 382/173 |
| 2014/0126841 | A1 * | 5/2014 | Wang | G06F 17/30247 382/305 |

* cited by examiner

Primary Examiner — Todd Buttram

(57) ABSTRACT

Systems and methods are provided for viewing portions of a very high-resolution image on a client device. The systems and methods provide for dynamic establishment of hierarchically organized contexts corresponding to regions within the image. The context hierarchy supports image inspection and analysis at increasing resolution levels for successively smaller regions. A context's region can be viewed at a base resolution appropriate for that context, while areas of interest within the context can be examined in more detail in higher resolution. To view areas of interest at resolution levels above the range for a given context, a child context can be established for a smaller region. The client device user can navigate from one area within the image to another by traversing previously established contexts and establishing new contexts.

20 Claims, 11 Drawing Sheets

SYSTEMS AND METHODS FOR HIGH-RESOLUTION IMAGE VIEWING

CROSS-REFERENCE TO RELATED APPLICATIONS

The present application claims priority to U.S. Provisional Patent App. No. 61/875,278, filed Sep. 9, 2013 and entitled "Systems and Methods for High-Resolution Image Viewing."

The present application is related to U.S. patent application Ser. No. 12/834,806, titled "Systems and Methods for Networked, In-Context, High Resolution Image Viewing," filed on Jul. 12, 2010, and issued as U.S. Pat. No. 8,296,359 on Oct. 23, 2012, U.S. patent application Ser. No. 12/834,809, titled "Systems and Methods for Collaborative, Networked, In-Context, High Resolution Image Viewing" and filed on Jul. 12, 2010, U.S. patent application Ser. No. 12/834,810, titled "Systems and Methods for Networked, In-Context, Composed, High Resolution Image Viewing", filed on Jul. 12, 2010, and issued as U.S. Pat. No. 8,667,054 on Mar. 4, 2014, U.S. patent application Ser. No. 12/954,269, titled "Systems and Methods for Networked, In-Context, High Resolution Image Viewing," filed on Nov. 24, 2010, and issued as U.S. Pat. No. 7,991,837 on Aug. 2, 2011, and U.S. patent application Ser. No. 13/624,704, titled "Systems and Methods for Networked, In-Context, High-Resolution Image Viewing" and filed on Sep. 21, 2012, and issued as U.S. Pat. No. 8,572,168 on Oct. 29, 2013, all of which are hereby incorporated herein by reference in their entireties as if set forth in full.

FIELD

The systems and methods described herein generally relate to the field of image processing and more specifically to systems and methods for viewing portions of a very high-resolution image.

BACKGROUND

The ability to view high-resolution images is important for numerous applications. Frequently, such images are input, stored, or generated remotely from the user and need to be viewed over a network. In the medical field, such a capability is of value in the diagnosis and treatment of patients, as well as for research and physician education. Other applications that may benefit from such a capability include engineering, equipment operation and maintenance, digital maps, satellite imagery, forensics, etc. High-resolution images can be extremely large, and can exceed the ability of a computer system to store and display the images. For example, in the field of Digital Pathology, a whole-slide scan can be billions of pixels and multiple gigabytes in size. Furthermore, transmission of entire high-resolution images across a network places significant loads on the network and can negatively impact an application's response time and user experience if the user has to wait for the image data to be delivered across the network.

SUMMARY

Systems and methods are provided for viewing portions of an image in high resolution. At least a portion of a first base image for a first context can be displayed on a client device at a first base resolution. The client device can receive a user indication to advance to a second context for viewing a first area of interest at a first user-indicated position within the first context's region, wherein the second context's region includes a portion of the first context's region at the user-indicated position. The client device can determine the second context's region and resolution level range. The client device can display at least a portion of a second base image for the second context. The client device can receive a request to view a second area of interest at a second user-indicated position within the second context's region. The client device can display at least a portion of a first high-resolution image wherein the at least a portion of the first high-resolution image includes a portion of the second context's region at the user-indicated position, the resolution level of the first high-resolution image is higher than that of the second base image, and the at least a portion of the first high-resolution image is displayed along with the at least a portion of the second base image on the client device display.

In an embodiment, a computer-implemented method for displaying a portion of a first image in high-resolution is disclosed. One or more processors are programmed to perform the steps comprising: displaying at least a portion of a first base image for a first context; receiving a user indication to advance to a second context for viewing a first area of interest at a first user-indicated position within the first context's region, wherein the second context's region includes a portion of the first context's region at the user-indicated position; determining the second context's region and resolution level range; displaying at least a portion of a second base image for the second context; receiving a request to view a second area of interest at a second user-indicated position within the second context's region at a higher resolution level than that of the second base image; displaying at least a portion of a first high-resolution image wherein the at least a portion of the first high-resolution image includes a portion of the second context's region at the user-indicated position, the resolution level of the first high-resolution image is higher than that of the second base image, and the at least a portion of the first high-resolution image is displayed along with the at least a portion of the second base image on the client device display.

In an embodiment, the resolution level of the first base image is less than or equal to the maximum resolution at which the image was captured, input, or generated.

In an embodiment, the resolution level of the second base image is less than or equal to the maximum resolution at which the image was captured, input, or generated.

In an embodiment, the resolution level of the first high-resolution image is less than or equal to the maximum resolution at which the image was captured, input, or generated.

In an embodiment, the resolution level range comprises a single resolution level, a discrete set of resolution levels, a continuous range of resolution levels, or a combination of one or more discrete resolution levels and one or more continuous ranges of resolution levels.

In an embodiment, the method further comprises retrieving the first base image or the at least a portion of the first base image from a server over a network.

In an embodiment, the method further comprises retrieving the second base image or the at least a portion of the second base image from a server over a network.

In an embodiment, the method further comprises retrieving the first high-resolution image or the at least a portion of the first high-resolution image from a server over a network.

In an embodiment, the first high-resolution image or the at least a portion of the first high-resolution image is retrieved from the server in advance of receiving the request to view the second area of interest.

In an embodiment, the method further comprises retrieving the first base image or the at least a portion of the first base image from a component of the client device.

In an embodiment, the method further comprises retrieving the second base image or the at least a portion of the second base image from a component of the client device.

In an embodiment, the method further comprises retrieving the first high-resolution image or the at least a portion of the first high-resolution image from a component of the client device.

In an embodiment, the method further comprises generating the second base image or the at least a portion of the second base image from the first base image or the at least a portion of the first base image.

In an embodiment, the method further comprises generating the at least a portion of the first base image from the first base image.

In an embodiment, the method further comprises generating the at least a portion of the second base image from the second base image.

In an embodiment, the method further comprises generating the at least a portion of the first high-resolution image from the high-resolution image.

In an embodiment, the method further comprises demarcating within the at least a portion of the first base image the first area of interest.

In an embodiment, the method further comprises demarcating within the at least a portion of the first base image the first user-indicated position.

In an embodiment, the method further comprises demarcating within the at least a portion of the first base image the region corresponding to the second context.

In an embodiment, the method further comprises demarcating within the at least a portion of the second base image the second area of interest.

In an embodiment, the method further comprises demarcating within the at least a portion of the second base image the second user-indicated position.

In an embodiment, the method further comprises demarcating within the at least a portion of the second base image the region corresponding to the at least a portion of the first high-resolution image.

In an embodiment, the method further comprises demarcating within the at least a portion of the first base image the second area of interest.

In an embodiment, the method further comprises demarcating within the at least a portion of the first base image the second user-indicated position.

In an embodiment, the method further comprises demarcating within the at least a portion of the first base image the region corresponding to the at least a portion of the first high-resolution image.

In an embodiment, the resolution level of the at least a portion of the first base image is selected based in part on the capabilities of the client device.

In an embodiment, the resolution level of the at least a portion of the second base image is selected based in part on the capabilities of the client device.

In an embodiment, the resolution level of the at least a portion of the first high-resolution image is selected based in part on the capabilities of the client device.

In an embodiment, the size of the first context's region is determined based in part on the capabilities of the client device.

In an embodiment, the size of the second context's region is determined based in part on the capabilities of the client device.

In an embodiment, the size of region corresponding to the first high-resolution image is determined based in part on the capabilities of the client device.

In an embodiment, the method further comprises replacing on the client device display the at least a portion of the first base image with at least a portion of a base image for a corresponding region in a second image.

In an embodiment, the method further comprises replacing on the client device display the at least a portion of the second base image with at least a portion of a base image for a corresponding region in a second image.

In an embodiment, the method further comprises replacing on the client device display the at least a portion of the first high-resolution image with at least a portion of a high-resolution image for a corresponding region in a second image.

In an embodiment, the method further comprises receiving a user indication to advance to a third context for viewing a third area of interest at a third user-indicated position within the second context's region, wherein the third context includes a portion of the second context at the user-indicated position; determining the third context's region and resolution level range; displaying at least a portion of a third base image for the third context.

In an embodiment, the method further comprises, when determining the third context's region and resolution level range, disabling the handling of the receiving a user indication to advance to a third context and the receiving a request to view a second area of interest.

In an embodiment, the third base image or the at least a portion of the third base image is retrieved from a server over a network.

In an embodiment, the third base image or the at least a portion of the third base image is retrieved from a component of the client device.

In an embodiment, the method further comprises demarcating within the at least a portion of the second base image the region corresponding to the third context.

In an embodiment, the method further comprises demarcating within the at least a portion of the second base image the third area of interest.

In an embodiment, the method further comprises demarcating within the at least a portion of the second base image the third user-indicated position.

In an embodiment, the method further comprises demarcating within the at least a portion of the first base image the region corresponding to the third context.

In an embodiment, the method further comprises demarcating within the at least a portion of the first base image the third area of interest.

In an embodiment, the method further comprises demarcating within the at least a portion of the first base image the third user-indicated position.

In an embodiment, the method further comprises saving the steps for advancing to the third context.

In an embodiment, the steps for advancing to the third context are saved on a server.

In an embodiment, the steps for advancing to the third context are saved on the client device.

In an embodiment, the method further comprises replaying the saved steps for advancing to the third context.

In an embodiment, the method further comprises receiving a request to view a fourth area of interest at a fourth user-indicated position within the first context's region;

displaying at least a portion of a second high-resolution image corresponding to the fourth area of interest wherein the resolution level of the second high-resolution image is higher than that of the first base image, and the at least a portion of the second high-resolution image is displayed along with the at least a portion of the first base image on the client device display.

In an embodiment, the resolution level of the second high-resolution image is less than or equal to the maximum resolution at which the image was stored, input, or generated.

In an embodiment, wherein the resolution level of the at least a portion of the second high-resolution image is determined based in part on the capabilities of the client device.

In an embodiment, the method further comprises demarcating within the at least a portion of the first base image the fourth area of interest.

In an embodiment, the method further comprises demarcating within the at least a portion of the first base image the fourth user-indicated position.

In an embodiment, the method further comprises demarcating within the at least a portion of the first base image the region corresponding to the at least a portion of the second high-resolution image.

In an embodiment, the second high-resolution image or portion thereof is retrieved from a server over a network.

In an embodiment, the second high-resolution image or portion thereof is retrieved from a component of the client device.

In an embodiment, the second base image or portion thereof is generated from the second high-resolution image.

In an embodiment, the second high-resolution image or portion thereof is retrieved from the server in advance of receiving the request to view the third area of interest.

In an embodiment, the portion of the second high resolution image is generated from the second high-resolution image.

In an embodiment, the method further comprises saving the steps for displaying the second high-resolution image within the first context.

In an embodiment, the steps for displaying the second high-resolution image are saved on a server.

In an embodiment, the steps for displaying the second high-resolution image are saved on the client device.

In an embodiment, the method further comprises replaying the saved steps for displaying the second high-resolution image.

In an embodiment, the method further comprises centering the first user-indicated position within the second context's region.

In an embodiment, the method further comprises, when the second context's region would overlap an edge of the first context's region if the first user-indicated position were centered, offsetting the second context's region relative to the first user-indicated position to eliminate the overlap.

In an embodiment, the method further comprises, when the second context's region would overlap an edge of the first context's region if the first user-indicated position were centered, extending the first context's region to include the area of overlap.

In an embodiment, the method further comprises, when the second context's region would overlap an edge of the first context's region if the first user-indicated position were centered, including within the second context a portion of a sibling context of the first context corresponding to the overlap area.

In an embodiment, the at least a portion of the second base image overlays or replaces the at least a portion of the first base image on the client device display.

In an embodiment, the overlaying or replacing the at least a portion of the first base image is such that, at the first user-indicated position on the display, a point in the at least a portion of the second base image matches a point in the underlying or replaced at least a portion of the first base image.

In an embodiment, when the at least a portion of the second base image does not fully overlay the at least a portion of the first base image, the at least a portion of the second base image is demarcated from the at least a portion of the first base image.

In an embodiment, the method further comprises receiving a request for reverting to the first context, removing the at least a portion of the first high-resolution image from the display, and removing the at least a portion of the second base image from the display.

In an embodiment, the method further comprises displaying the at least a portion of the first base image when it has been replaced by the at least a portion of the first base image on the client device display.

In an embodiment, the method further comprises demarcating within the at least a portion of the first base image the second context's region.

In an embodiment, the method further comprises demarcating within the at least a portion of the first base image the area of interest corresponding to the second context.

In an embodiment, the method further comprises demarcating within the at least a portion of the first base image the user-indicated position of the area of interest corresponding to the second context.

In an embodiment, the method further comprises demarcating within the at least a portion of the first base image the region corresponding to the at least a portion of the first high-resolution image.

In an embodiment, the method further comprises demarcating within the at least a portion of the first base image the area of interest corresponding to the at least a portion of the first high-resolution image.

In an embodiment, the method further comprises demarcating user-indicated position of the area of interest corresponding to the at least a portion of the first high-resolution image within the first base image.

In an embodiment, the method further comprises saving the steps for displaying the first high-resolution image within the second context.

In an embodiment, the steps for displaying the first high-resolution image are saved on a server.

In an embodiment, the steps for displaying the first high-resolution image are saved on the client device.

In an embodiment, the method further comprises replaying the saved steps for displaying the first high-resolution image.

In an embodiment, the method further comprises saving the steps for advancing to the second context.

In an embodiment, the steps for advancing to the second context are saved on a server.

In an embodiment, the steps for advancing to the second context are saved on the client device.

In an embodiment, the method further comprises replaying the saved steps for advancing to the second context.

In an embodiment, the image is a video.

In an embodiment, the method further comprises

In an embodiment, displaying the at least a portion of the first high-resolution image comprises synchronizing a frame rate and a currently displayed frame of the at least a portion of the first high-resolution image with a frame-rate and currently displayed frame of the at least a portion of the second base image.

In an embodiment, displaying the at least a portion of the second base image comprises synchronizing a frame rate and a currently displayed frame of the at least a portion of the second base image with a frame-rate and currently displayed frame of the at least a portion of the first base image.

In an additional embodiment, a method for high-resolution image viewing is disclosed. The method comprises using one or more hardware processors to: display a first image on a display, the first image comprising at least a first portion of an image at a first resolution; receive a first user indication of a first position within the at least a first portion of the image; receive a second user indication to change context; in response to the second user indication, display a second image on the display, wherein the second image comprises a second portion of the at least a first portion of the image at a second resolution, and wherein the second image comprises a first area of interest that includes the first position; receive a third user indication of a second position within the second portion of the at least a first portion of the image; and, in response to the third user indication, display a third image on the display in context with the second image, wherein the third image comprises a third portion of the second portion of the at least a first portion of the image at a third resolution which is higher than the second resolution, and wherein the third portion comprises a second area of interest that includes the second position.

In an additional embodiment, a system for high-resolution image viewing is disclosed. The system comprises at least one hardware processor; and one or more executable software modules configured to, when executed by the at least one hardware processor, display a first image on a display, the first image comprising at least a first portion of an image at a first resolution, receive a first user indication of a first position within the at least a first portion of the image, receive a second user indication to change context, in response to the second user indication, display a second image on the display, wherein the second image comprises a second portion of the at least a first portion of the image at a second resolution, and wherein the second image comprises a first area of interest that includes the first position, receive a third user indication of a second position within the second portion of the at least a first portion of the image, and, in response to the third user indication, display a third image on the display in context with the second image, wherein the third image comprises a third portion of the second portion of the at least a first portion of the image at a third resolution which is higher than the second resolution, and wherein the third portion comprises a second area of interest that includes the second position.

BRIEF DESCRIPTION OF THE DRAWINGS

Features, aspects, and embodiments are described in conjunction with the attached drawings, in which.

DETAILED DESCRIPTION

Figure 1:
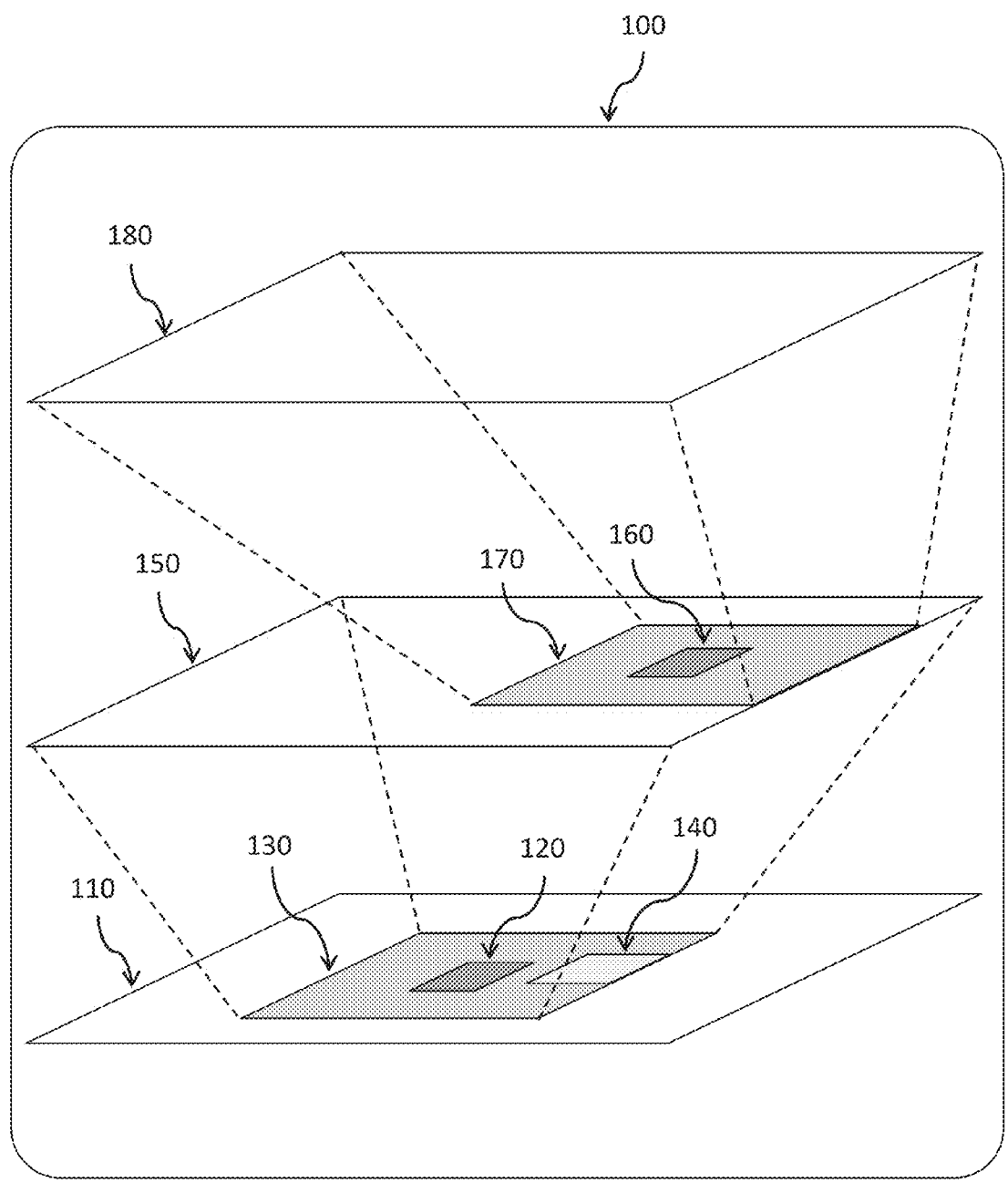
FIG. 1 is a diagram illustrating the context hierarchy of the high-resolution image viewing system, according to an embodiment.

Systems and methods are provided that facilitate the viewing portions of an image in high resolution on a client device. Embodiments provide the capability to efficiently and effectively view very high-resolution images over a network, and are also effective for viewing such images locally.

The methods described herein specifically address the challenges associated with viewing high-resolution images, including very high-resolution images. An example of such very high-resolution images is Pathology whole slide scans, which at the present time comprise billions of pixels and multiple gigabytes per layer. Such scans may be performed at multiple layers on a single slide for focusing at different depths, compounding their total size. Another example is digital maps that have many billions of pixels for a geographic area. The methods can also be effective for images with resolution as low as five million pixels, or for even smaller images.

A high-resolution image can consume a significant amount of memory, and can be too large to fully view at the native resolution in the available area of a client device's display. A high-resolution image can also take a considerable amount of time to download from a server over a network, or can otherwise stress the capabilities of the client, server, or network. For images of the size of Pathology whole slide scans (billions of pixels), network transmission times for the full image may be several hours (depending on the network capabilities), and the full image size can be tens of gigabytes, often exceeding a client device's memory. In many applications, a base (low-to-medium resolution) image can be sufficient for basic inspection of the image or to provide context for zooming in. A user generally only needs to see selected areas of interest of the image at high resolution (higher resolution than the base image's resolution), and not the entire image. For example, a Pathology whole-slide scan image may cover a slide of 1500 to 2000 mm², while the area of interest to a Pathologist viewing the image may be less than 1 mm². However the Pathologist may need to quickly view portions of the slide at a medium resolution higher than the base in order to find the area of interest.

In viewing such large images, in addition to the data processing challenges, there are also visualization challenges. In particular, with the images being several orders of magnitude larger than the client display, when a user is viewing an area at the highest resolution, only a fraction of a percent of the image is viewable on a typically client device display. Thus, the user can lose the context of the information being viewed, and also miss important features in other areas. This is particularly an issue, for example, in the medical field, where a physician needs to view a lesion in high resolution in the context of the surrounding tissue.

To address these challenges, the systems and methods presented herein provide for dynamic establishment of hierarchically organized contexts corresponding to regions within the image. The context hierarchy supports image inspection and analysis at increasing resolution levels for successively smaller regions. A context's region can be viewed at a base resolution appropriate for that context, while areas of interest within the context can be examined in more detail in higher resolution. To view areas of interest at resolution levels above the range for a given context, a child context can be established for a smaller region. The client device user can navigate from one area within the image to another by traversing previously established contexts and establishing new contexts.

The methods described herein not only afford the user an effective capability for very high-resolution image inspection and analysis, but also provide a highly responsive user experience. The methods provide distinct advantages over alternative methods that are prevalent today.

The methods described herein can be used with a variety of high-resolution image viewing technologies for retrieving images over a network and displaying them in high resolution. They may be especially effective when combined with the high-resolution image viewing methods described in U.S. Pat. Nos. 7,991,837, 8,296,359, and 8,572,168, each titled "Systems and Methods for Networked, In-context, High-resolution Image Viewing", and related patent applications, embodied in the OpusZoom® Magnifier (www.opuszoom.com) software products. These methods and the associated products enable viewing of images in high resolution over a network via a virtual lens that can be moved over a base image to show areas of interest in high resolution in the context of the image.

Some conventional image viewing systems allow a user to magnify a portion of an image, but these systems typically magnify a portion of the computer display using digital magnification methods rather than obtaining and displaying a higher resolution image that can actually contain additional detail. In some conventional systems, a portion of a bitmap corresponding to an image being displayed to a user is digitally enlarged to create a magnification effect. This approach does not provide any additional detail, but rather uses digital enhancement of a lower resolution image to create the simulated magnified image. For example, the pixels in the original lower resolution image can be replicated to create the simulated magnified image, and one or more smoothing algorithms might be applied to the magnified image. However, the resulting simulated magnified image can be grainy, can lack detail, or introduce artifacts that were not in the original image. Some conventional systems also magnify the whole image rather than just a user-selected area of interest within the image. For example, ADOBE READER® and MICROSOFT OFFICE® magnify a whole image or document page rather than a user-selected area of interest within an image or document page.

In contrast, the methods described here enable efficient display in high resolution of user-indicated areas of interest of an image that has been captured, input, or generated at a maximum resolution. The client device can display the user-indicated area of interest with up to all of the detail available at the maximum resolution at which the image was captured, input or generated.

Conventional systems also do not use a client-server based approach to digital magnification or in-context high-resolution display. In conventional systems, images or documents are stored locally on a computer system and all or a portion of the document can be magnified using the conventional techniques described above. In contrast, the methods described here can use a client-server based approach where the maximum-resolution images are stored on, generated on, or input to a server and smaller base images and higher-resolution images can be transmitted across the network to the client device, thereby saving network bandwidth as well as processing and memory resources on both the client device and the server, and providing good response times.

Some current methods for viewing very high-resolution images over a network rely on tiling of the image into small images. Examples of systems implementing tiling are Google Maps™, Apple Maps™, and Pathology whole-slide image viewers such as Spectrum Webscope™ and Aperio ImageScope™. In such systems, high-resolution images are cut up into smaller tiles. The tiles for a user-selected region are transmitted to the client device and displayed. If the user desires to view another region, tiles for that region are downloaded. The systems allow for zooming in to increase the resolution over a smaller area, or zooming out to show a larger area at lower resolution. To zoom in, tiles of higher resolution must be downloaded. Disadvantages of such systems is that panning the image is often slow since new tiles need to be downloaded over the network, zooming in can also be slow since multiple tiles at a different resolution need to be loaded, and, when zooming in, the context is lost. Some systems use a thumbnail or small image to provide context, but such approaches have the disadvantages of consuming additional display space, dividing the user's focus, and not providing sufficient detail for identifying areas of interest in very high-resolution images.

The methods described herein greatly improve on current methods, enabling very fast scanning across an image and zooming in (increasing resolution) and zooming out (decreasing resolution), as well as preserving context when zooming in at higher resolutions.

DESCRIPTIONS OF CONCEPTS AND TERMS

In this specification, the term "Recursive Magnifier" is used to refer to embodiments of the systems and methods disclosed herein. The term refers to repeated application of high-resolution image viewing methods in an integrated system as described herein. The definitions of the words within the term individually or in combination do not themselves describe or imply a particular method or mechanism.

The term "image," when used without qualifiers, refers to the image being viewed using the systems and methods described herein. It can be a portion of a larger image. It can also comprise multiple images.

The term "resolution," as used herein, refers to the total number of pixels of an image and can also refer to the total number of colors per pixel for an image. For example, resolution can refer to the total number of horizontal pixels by the total number of vertical pixels in an image. In yet other embodiments, an optional third dimension can be included, and the resolution can include a depth component. The resolution may also include a time dimension if the image changes in time. With respect to video content, resolution can be related to the total number of frames per second. The resolution can alternatively refer to the type of detail, level of detail, or quantity of details of an image. For example, it can refer to the type or number of roadways or other features illustrated on a map (e.g., no roadways, highways only, all roads, public buildings, businesses, all buildings, elevations, satellite photos, aerial photos, ground photos, etc.). Thus, the term "higher resolution" may refer to more detail, including, without limitation, greater pixel density, more color levels, additional types of details, additional quantities of details, higher frame rate, more depth levels, or additional features.

The term "maximum resolution" refers to the resolution at which an image was captured (e.g., via a digital camera, scanner, or sensor), input, or generated (e.g., with image or video authoring tools, or image generation logic).

The term "resolution level" refers to a resolution that is normalized to the maximum resolution for an image. When resolution level is used with a portion of an image, it refers to the resolution of the full image (of which the portion is a subset) normalized to the maximum resolution. For example, by way of illustration, if an image has a maximum resolution of 1000×1000 and an image for a region comprising the upper-left quadrant of the image has a resolution of 500×500, the image for the region comprising the upper-left quadrant has a resolution level equal to the maximum resolution. In another example, if an image comprising the upper-left quadrant has a resolution of 250×250 and an image comprising the top half has a resolution of 500×250 (width times height), the resolution levels of the two images are equal, and the resolution level of the image is less than the maximum resolution (which is 1000×1000).

The term "context" is used herein to describe a region within an image, the "context's region," and associated attributes. Contexts can be organized in a hierarchy, with a "parent context" having one or more "child contexts" for sub-regions within the parent. The "root context" for an image is the parent of all other contexts. The root context's region covers the whole image being viewed. Child contexts can be dynamically established in a multi-level hierarchy as the user navigates within the image.

Each context has an associated range of resolution levels, referred to herein as a "quantum". Each quantum can comprise a single resolution level, a set of discrete resolution levels, a continuous range of resolution levels, or a combination of discrete resolution levels and ranges of resolution levels. A resolution level within a quantum cannot exceed the maximum resolution for an image. The resolution level range within a quantum can be determined for a particular application based on image size, usability, response time, client device capabilities, network throughput and delay, user inputs, and other factors. The resolution levels spanned can differ among quanta, and, when there are discrete resolutions within a quantum, the spacing interval for the discrete resolutions can be the same or can differ. A context for which the upper bound of the resolution range is the maximum resolution is referred to as a "leaf context."

A "high-resolution image" for a context refers to an image within the context's region at a resolution level within the resolution range of the context's quantum.

A "base image" refers to an image used for viewing all or a portion of a context's region for the purpose of basic inspection and to provide a visual frame of reference. The base image can be displayed at any resolution level below the maximum resolution. The resolution level at which the base image is displayed is referred to as the "base resolution". The base resolution for a context is less than the lower bound of the resolution level range of the context's quantum. In an embodiment, in typical usage, the base resolution for a child context is higher than that of its parent. This is not a requirement, however.

The term "area of interest" refers to an area within a context's region at a position indicated by the user. The size or shape of the area is not necessarily included in the position indication. The size can be as small as a point or as large as a context's region.

An additional term used herein is "invoke" (and the related term "invocation"), as used in phrases such as "invoke high-resolution image viewing logic" or, equivalently, "invoke a high-resolution image viewer." An invocation of a high-resolution image viewer performs high-resolution image viewing functions for a single context. Invoke is used herein in a general sense, meaning cause to be carried out or executed. It does not imply a particular method. The actual invocation method or mechanism with regard to the high-resolution image viewer can vary among embodiments. Possible methods include, but are not limited to, a procedure, subroutine, or function call, an instantiation, a transfer of control, or another method of causing execution, or any combination thereof. The high-resolution image viewer may be implemented as a software object, a software library, a process, a thread, or may be logic in either hardware and software or a combination thereof. It may also be an integral part of a Recursive Magnifier embodiment. It is assumed that there is execution context for each high-resolution image viewer invocation comprising the parameters for the associated image context, the base and high-resolution images for that context, and other data, such as user inputs, state information, or processed data. Some of the execution context may be shared among different invocations. For example, an image used in one invocation may also be used within another. Further, one invocation of a high-resolution image viewer may have different code or logic than another, or may be configured differently from another.

Context Hierarchy

FIG. 1 is a visualization illustrating dynamically established, hierarchically organized contexts and related methods in Recursive Magnifier 100, according to an embodiment. Three example contexts are depicted: first context 110, the root context for the image. Second context 150, a child of the first context 110 for region 130 within the first context's region. Third context 180, a child of the second context 150 for region 170 within second context's region. There can be addition levels of descendant contexts (children, children of children, etc.). Each parent context can have multiple child contexts for different, possibly overlapping regions within the parent. While regions are illustrated as rectangular in the figure, they can be any shape.

The Recursive Magnifier 100 can perform user-requested actions for area of interest 120 within first context 110. One such action is to display a region that includes area of interest 120 at resolution levels within the first context's quantum. Another such action is to establish and advance to a second context 150, a child of first context 110, whose region 130 includes area of interest 120.

Similarly, within second context 150, the Recursive Magnifier 100 can perform user-requested actions for area of interest 160. One such action is to display a region that includes area of interest 160 at resolution levels within the first context's quantum. Another such action is to establish and advance to a third context 180, a child of second context 150, whose region 170 includes area of interest 160. Region 170 in context 150 corresponds to region 140 in context 110.

The sizes of regions 130 and 170 associated with child contexts can vary, with consideration given to display area layout, display area sizes, the resolution range within the context's quantum, area of interest size range, usability, network performance, and other factors. The resolution level range within each context's quantum can be determined considering display area layout, available display space, network and server performance, area of interest size ranges, usability, and other factors.

For regions 130 and 170 corresponding to child contexts 150 and 180, or for regions used in displaying high-resolution images at resolution levels within a context's quantum, there can be alternatives for how an area of interest is positioned within its corresponding region.

In an embodiment, areas of interest 120 and 160 can be centered within their respective regions 130 and 170. In an embodiment, areas of interest 120 and 160 can be offset from the center of their respective regions 130 and 170. In an embodiment, region 170 can be reduced in size to maintain the centering of area of interest 160 within it.

In an embodiment, offsetting can be employed, for example, if area of interest 160 is near the edge second context's region 150, and if a portion region 170 would be outside of (i.e., overlap the edge of) second context's region 150 if area of interest 160 were centered. The offset is such that the overlap is reduced or eliminated. Offsetting can also be employed to improve usability.

In an embodiment, region 170 can be reduced in size if an overlap occurs to reduce or eliminate such an overlap while keeping the area of interest 160 centered within region 170.

In an embodiment, a portion of the region of a sibling of context 150 whose region includes the area of overlap can be included in region 170. This can be done as long as the overlap does not go outside the image (at which point, other methods can be applied).

In an embodiment, region 150 can be extended in size to cover any such overlap. Extending can be done up to the extension going outside the image. In an embodiment, extending region 150 can be done when the second context is established to cover potential overlaps. In an embodiment, extending region 150 can be done when needed. In an embodiment, extending region 150 can be done in response to a user action or request. In an embodiment, the extension can be demarcated or hidden in the display of the base image of the second context's region 150. In an embodiment, the extension can be demarcated in the display of the base image of the third context's region 180. In an embodiment, the extension can be demarcated in the display of a high-resolution image within the second context's quantum.

Client Device Display Layout

Display layouts are discussed in the descriptions for FIGS. 2 through 13 below. The display layouts provide for showing on the client device display the base image for a context, or a portion thereof, along with high-resolution images or portions thereof for areas of interest at user-indicated positions within the context's region. The base image provides a visual frame of reference for the areas of interest for high-resolution viewing as well as for advancing to child contexts. In an embodiment, for some contexts, a high-resolution image within a context is not displayed for the context, and the base image basically serves as a frame of reference for advancing to child contexts. In another embodiment, for some contexts, there can be no advancing to a child context, and the context provides only for high-resolution image viewing at resolution levels within the context's quantum. In an embodiment, a portion of a base image is displayed rather than the full image. In an embodiment, the base image can optionally be panned or scrolled to show hidden portions. In an embodiment, a portion of a high-resolution image containing the area of interest is displayed, rather than the full high-resolution image.

FIGS. 2 through 13 are examples illustrating various methods of laying out a client device display for base and high-resolution images displayed by the Recursive Magnifier. The display area used for displaying base and high-resolution images can be a whole client device display or one or more portions of a client device display such as one or more windows, or one or more portion of one or more windows (e.g., one or more HTML element of a web page displayed within a window). The examples illustrate how a variety of methods of high-resolution image viewing within a single context can be integrated into a multi-context system for very high-resolution image viewing.

FIGS. 2 through 5 illustrate the display of base and high-resolution images on a client device display according to an embodiment. Depicted in the figures is the Recursive Magnifier used with an in-context high-resolution image viewer such as the OpusZoom® Magnifier. The OpusZoom® Magnifier has the capability to show areas of interest in high-resolution within a movable virtual lens, overlaid on a base image.

Figure 2:
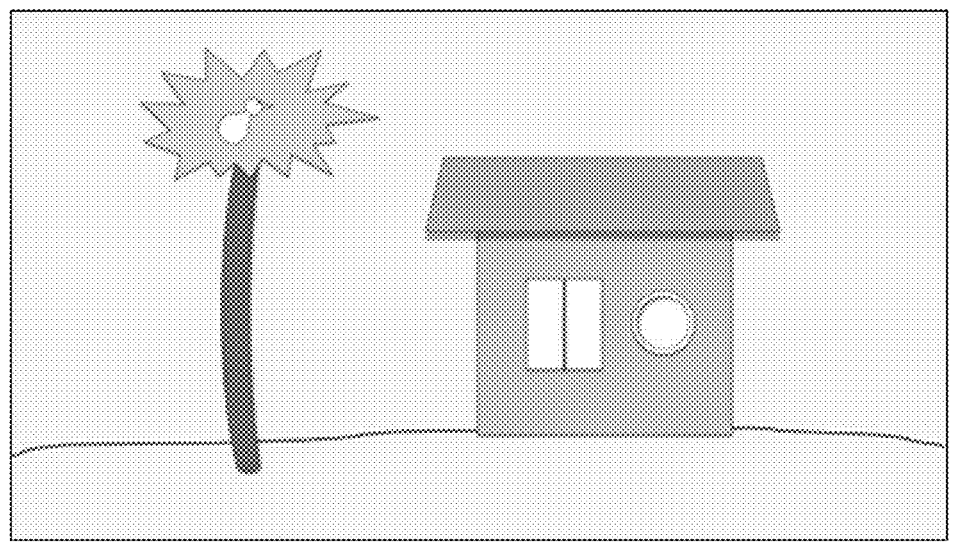
FIGS. 2-5 illustrate the display of base and high-resolution images on a client device display wherein portions of the high-resolution images are overlaid on the base image, according to an embodiment.
Figure 3:
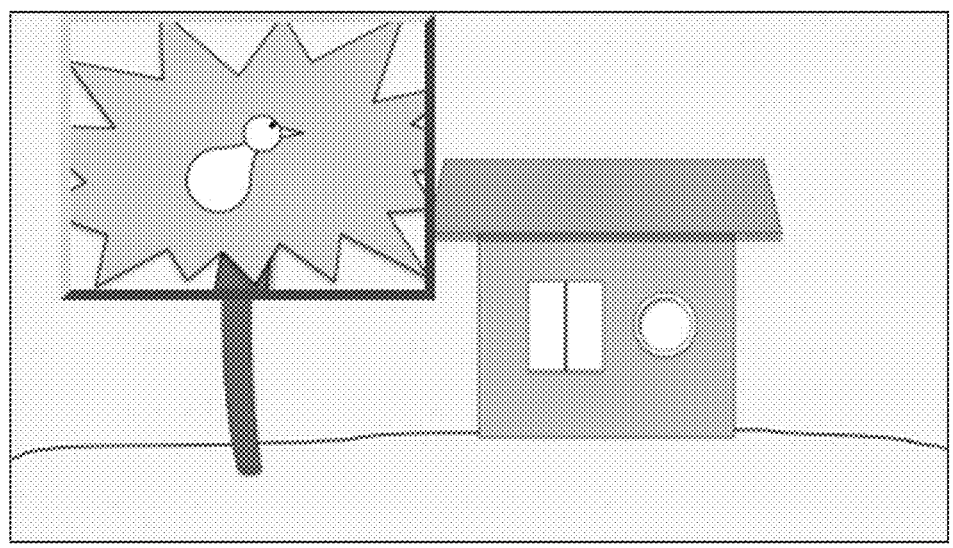
Figure 4:
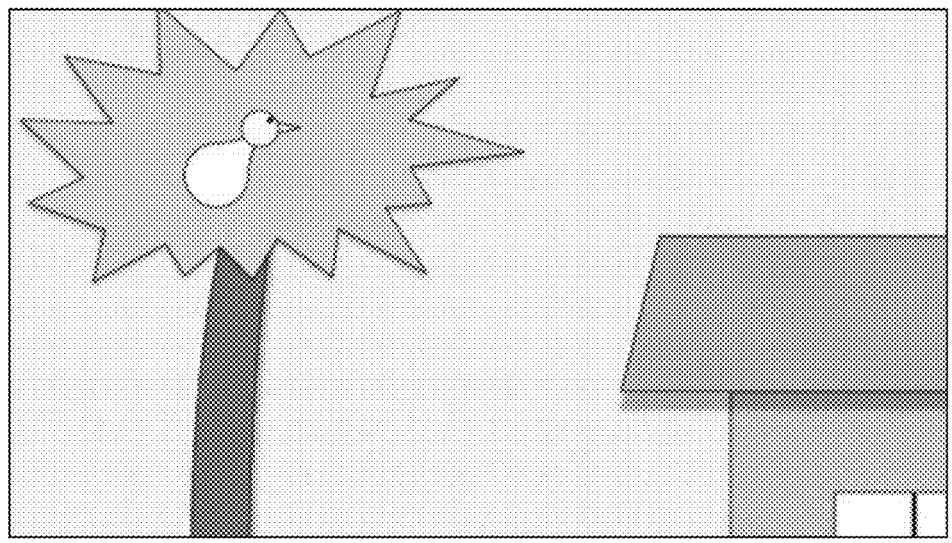
Figure 5:
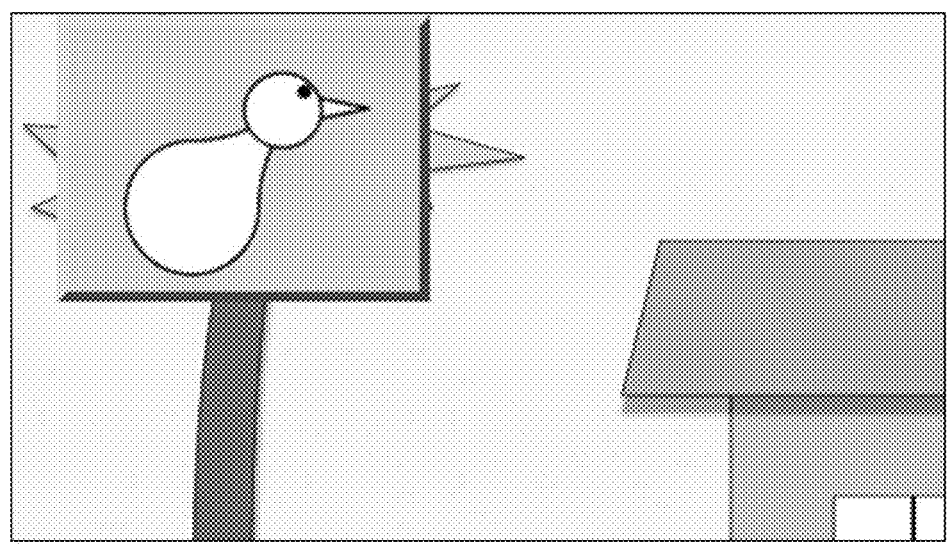

FIG. 2 illustrates how a base image can be displayed within a display area on a client device. FIG. 3 shows a portion of a high-resolution image corresponding to an area of interest at a user-indicated position, with a resolution level within the first quantum, overlaid in a virtual lens on the area of interest within the base image. FIG. 4 depicts a second base image displayed after advancing to a second context. In this example, the second base image can be generated from a larger portion of the high-resolution image displayed in the virtual lens in FIG. 3. Alternatively, it can be retrieved from a server or from other components on the client device. In this example, the size of the second base image matches that of the first, and the second base image is displayed in the same display area that the first base image was. FIG. 5 shows an area of interest within the second context, at roughly the same user-indicated position as previously, displayed within a virtual lens displaying a portion of a high-resolution image with a resolution level within the second context's quantum. In an embodiment, the user can indicate a position of another area of interest for viewing in high resolution in the virtual lens.

Figure 6:
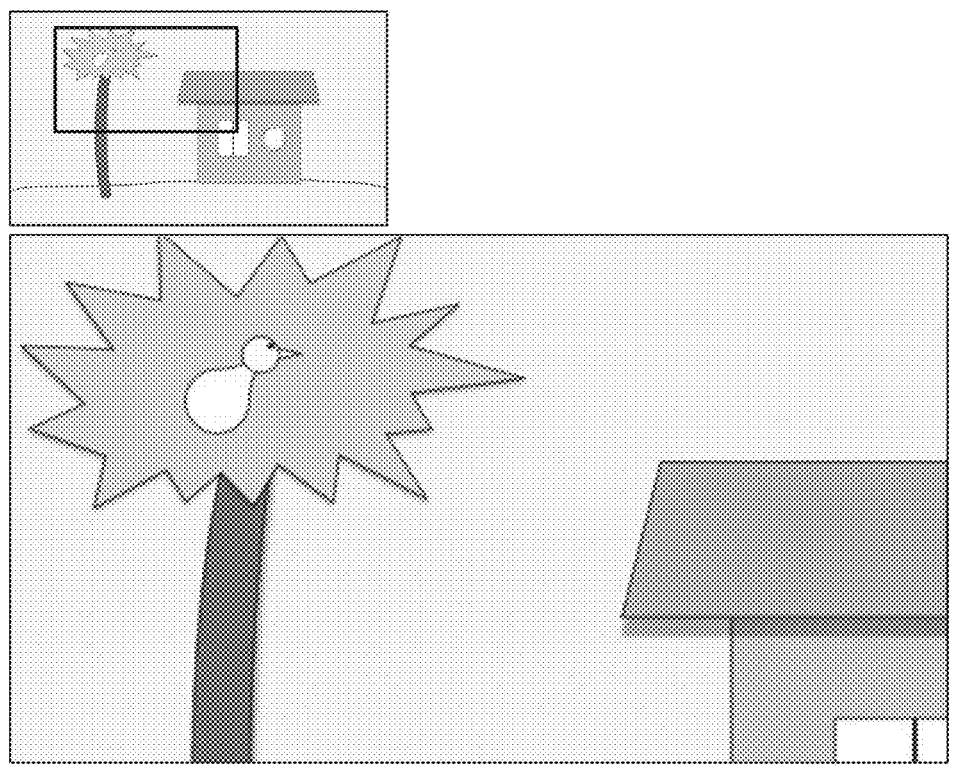
FIGS. 6 and 7 illustrate the display of base and high-resolution images on a client device display wherein the base images are shown separately from the high-resolution images, according to an embodiment.
Figure 7:
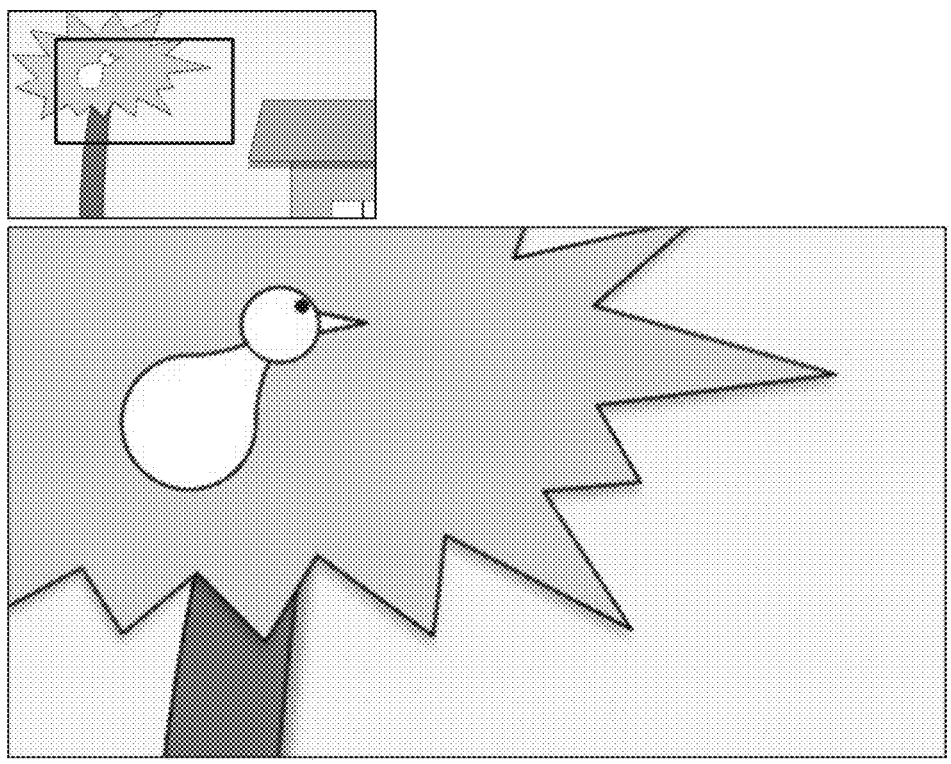

FIGS. 6 and 7 illustrate an alternative embodiment wherein the base images are shown separately from the high-resolution images. In this example, the base images are shown above the high-resolution images on the left side. In alternative embodiments, there can be any relative positioning of the base and high-resolution images (e.g., above-center, above-right, below, to the right or left, etc.). Also, the relative sizes of the display areas for the base and high-resolution images can vary.

In FIG. 6, the first base image is shown in the upper left. Within that, an area of interest at a user-indicated position is demarcated. The area of interest is shown, in the display area below the base image, at a resolution level within the first quantum. FIG. 7 illustrates the contents of the same display areas after advancing to a second quantum. In this example, in the upper left, a second base image for the second context has replaced the first base image. The second base image can be generated from the high-resolution image retrieved for display in FIG. 6. Alternatively, the second base image can be retrieved from the server or from other components on the client device. Shown in the display area below the second base image in FIG. 7 is a portion of a high-resolution image showing an area of interest at a resolution level within the second quantum. In an embodiment, within the second base image, the area of interest is demarcated corresponding to the same user-indicated position as in FIG. 6 from which the second context was invoked. In an embodiment, the user can indicate a different position of another area of interest to be viewed at a resolution level within the second context's quantum.

Figure 8:
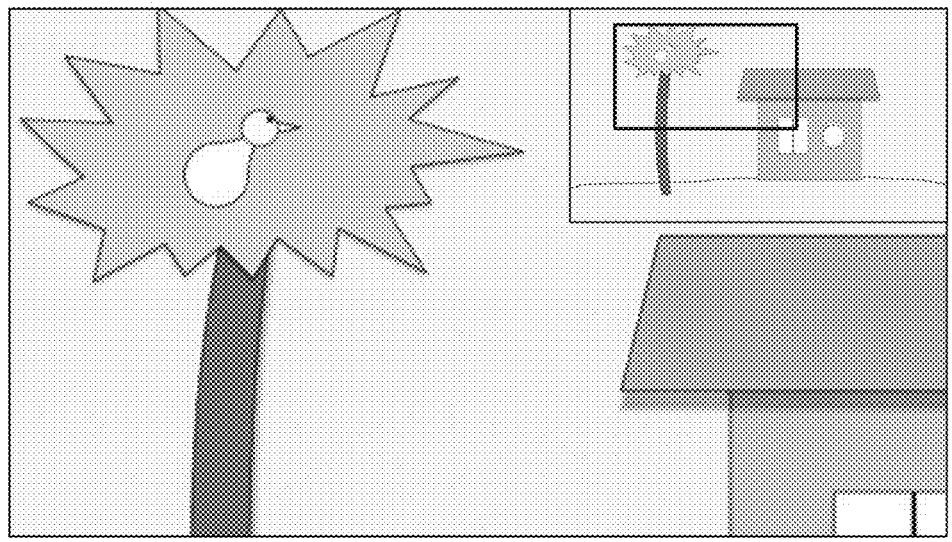
FIGS. 8 and 9 illustrate the display of base and high-resolution images on a client device display wherein the base images are shown separately from the high-resolution images within the same display area, according to an embodiment.
Figure 9:
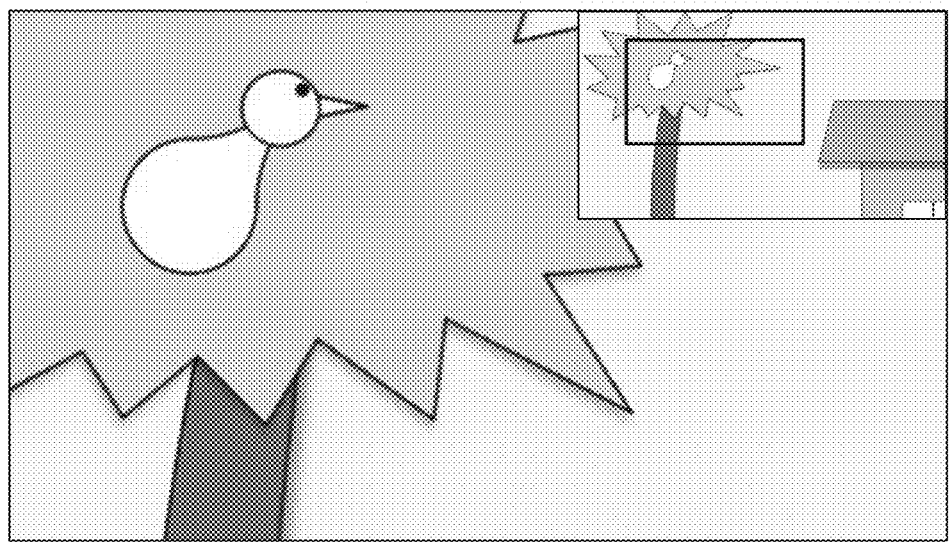

FIGS. 8 and 9 depict an alternative embodiment in which a base image and high-resolution image are displayed within the same display area, with the base image obscuring a portion of the high-resolution image. In this example, the base image is positioned at the upper left corner. It can be at any other position within the display area. Other than the relative position of the base and high-resolution images, the example is identical to that depicted in FIGS. 6 and 7.

Figure 10:
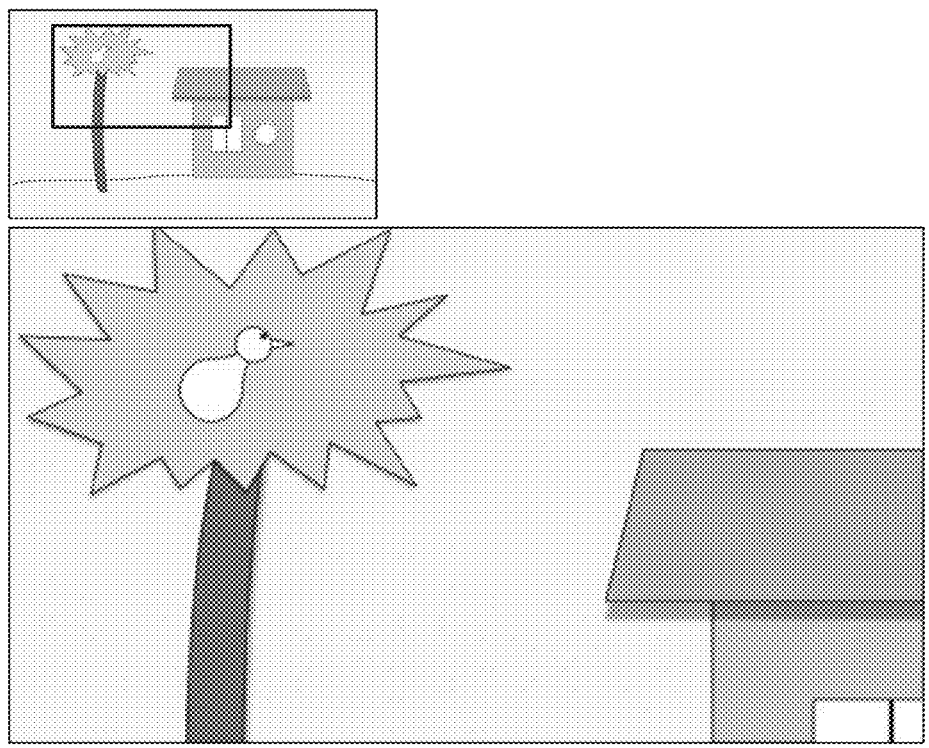
FIGS. 10 and 11 illustrate the display of base and high-resolution images on a client device display wherein the base images are shown separately from the high-resolution images and base images for multiple contexts are shown, according to an embodiment.
Figure 11:
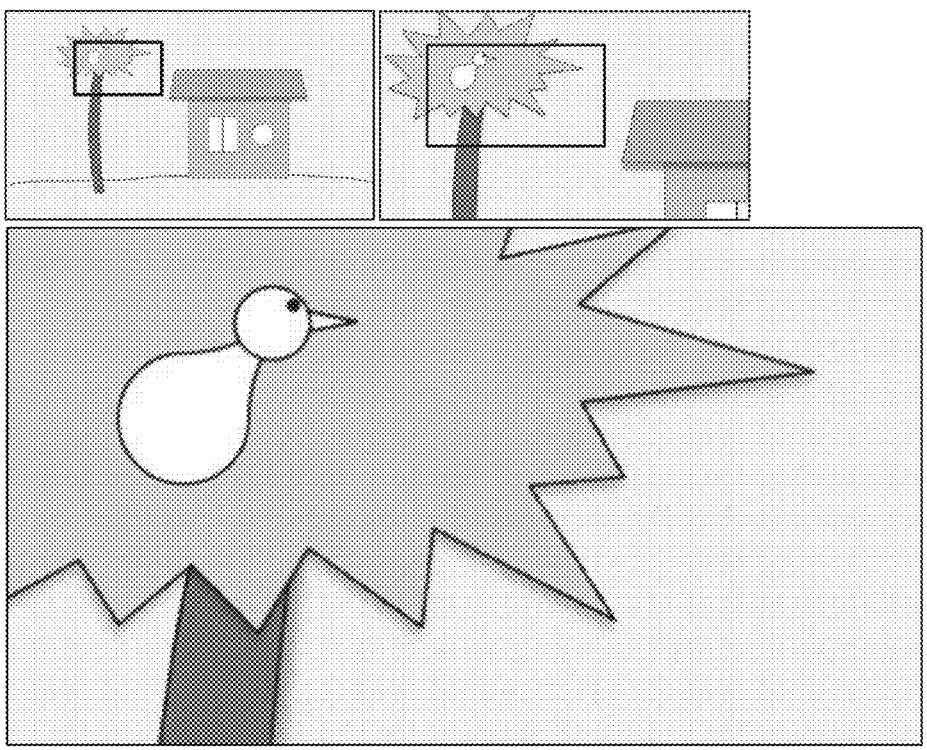

FIGS. 10 and 11 depict an embodiment in which, after advancing to a context beyond the first, base images for the current and a previous (in this example, the first) context are shown simultaneously on the display, along with a high-resolution image for an area of interest within the current context. This can be extended to show any number of base images for previous contexts, as well as the base image for the current context. In another embodiment, the base images for the previous and current contexts could share one or more display area, with the user able to switch among them. In another embodiment, the base image display area could be within the display area for the high-resolution images, as in the display layout depicted in FIGS. 8 and 9.

Figure 12:
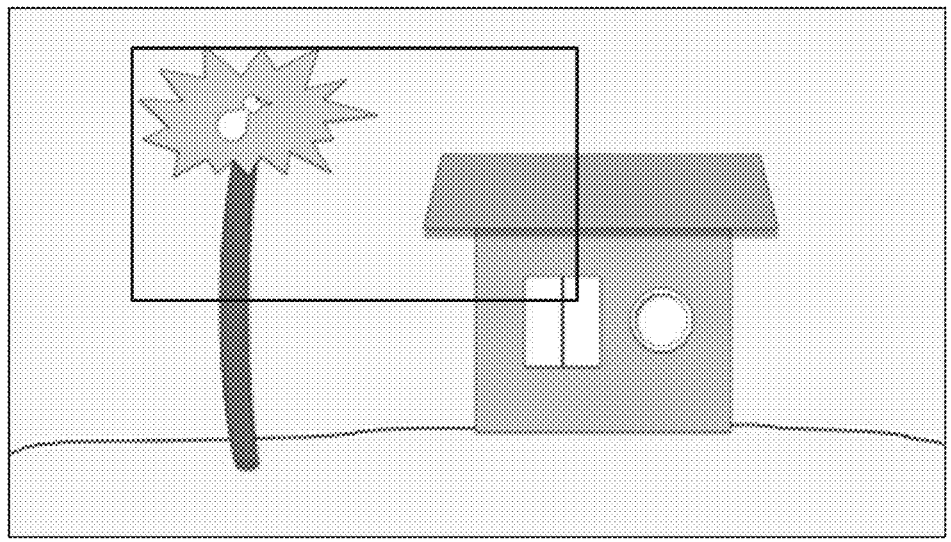
FIGS. 12 and 13 illustrate the display of base and high-resolution images on a client device display wherein the base images and high-resolution images are shown in the same display area at different times, according to an embodiment.
Figure 13:
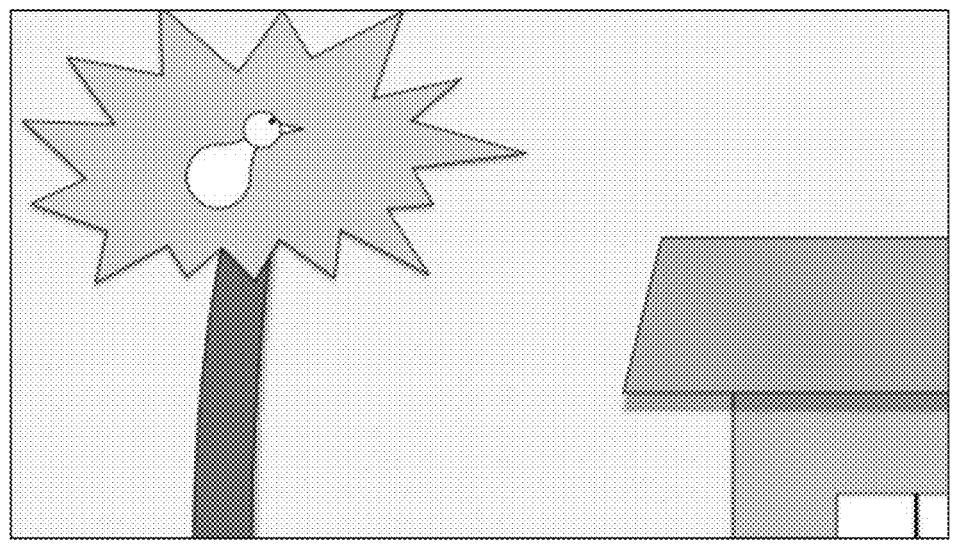

FIGS. 12 and 13 illustrate a simple display layout according to an embodiment, wherein the base image (FIG. 12) and high-resolution image (FIG. 13) in a context are displayed in the same display area at different times. The user has the ability to quickly switch between the base image and the high-resolution image. On the base image can be demarcated the area of interest at a user-indicated position corresponding to the high-resolution image.

In the above examples, alternatives exist for demarcating an area of interest. Demarcation can be within the base image, a high-resolution image, or both. In an embodiment, an area of interest can be demarcated. In an embodiment, a user-indicated position for an area of interest can be demarcated. In an embodiment, a region corresponding to a portion of a high-resolution image can be demarcated. In an embodiment, a region corresponding to a child context can be demarcated.

An advantage of the methods described herein is apparent from the display layouts presented above. For a given context can be displayed a base image, optionally demarcating an area of interest at a user-indicated position (or the alternatives discussed above) that can also be displayed in a high resolution within the resolution level range of the context's quantum. In advancing from one context to the next, a new base image can be shown with a smaller context. This enables the user to more effectively navigate within areas of interest, not only to indicate refinements to the position of the area of interest being examined, but also to move to new areas within the current context. It also enables the user to more easily visualize the context than if no base image is shown, or if a single base image is shown for all the resolution levels (as in some current systems). Indeed, for very high-resolution images (in the gigapixel order of magnitude or higher), if the base image remains constant and corresponds to the whole image, the area of interest becomes smaller and smaller as the user zooms in, reducing to only a few pixels at the higher resolutions. Further, with a single base image for all resolution levels, the base image is poorly suited for navigation and identifying areas of interest at such resolution levels. In contrast, with the methods described herein, the user can view contexts in enough detail to understand the relative position within the image, and also to identify and move to other areas of interest and subsequent contexts for deeper inspection. In addition, if the user wishes to examine areas outside the current context, the user can quickly revert to a previous context (see FIG. 15).

Very High-Resolution Image Viewing Methods

Figure 14:
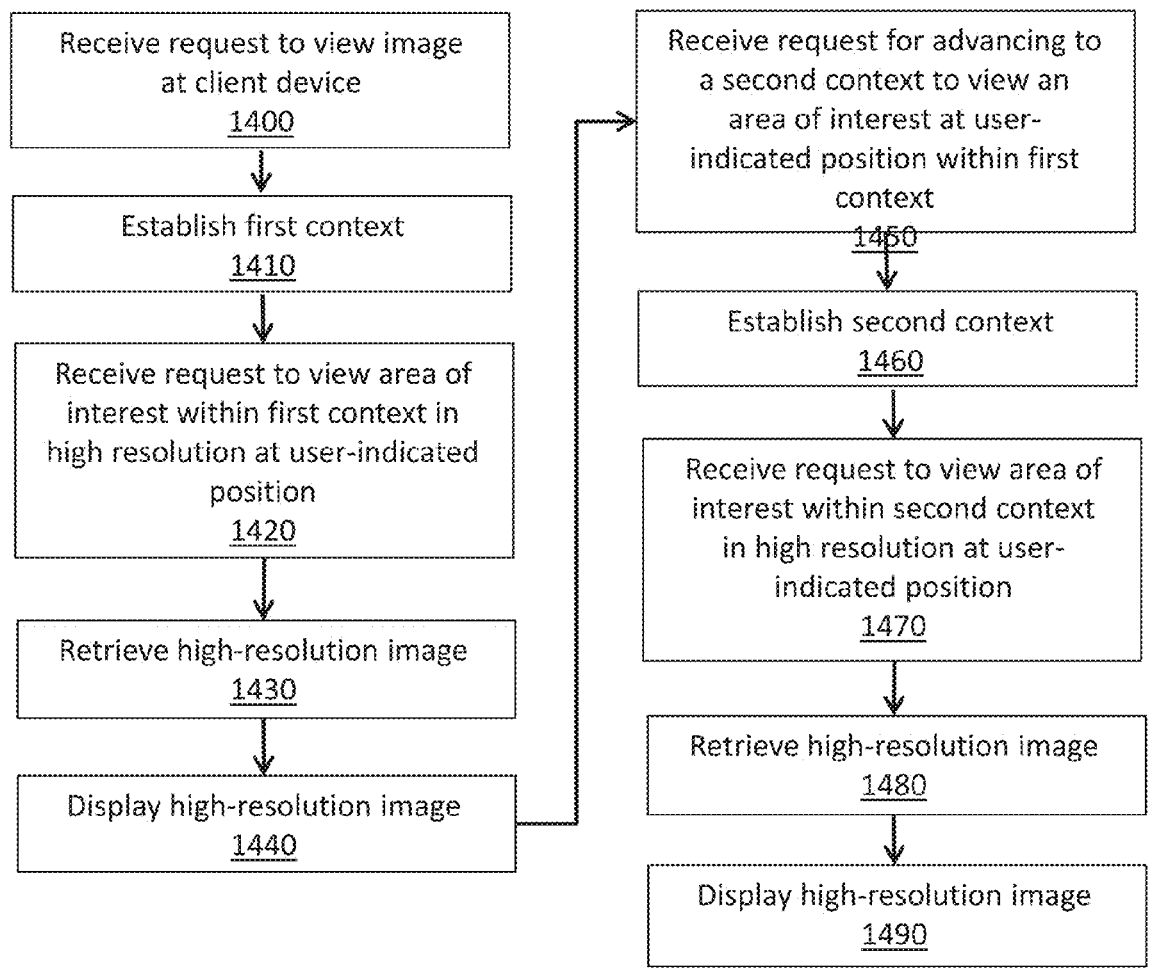
FIG. 14 is a flow diagram illustrating methods for high-resolution image viewing, according to an embodiment.

Moving to FIG. 14, depicted is a flow diagram illustrating methods for high-resolution image viewing, according to an embodiment. The figure provides an example of the steps performed within the Recursive Magnifier running on a client device to efficiently view an image in high-resolution. The steps are presented from the perspective of the client device on which the image is being displayed. In an embodiment, when images are retrieved from the server, there is processing on the server for providing images and related information in support of the client device processing. In another embodiment, the images and associated information can be retrieved locally from client memory, client software or hardware logic, or an input device on the client device, rather than from a server. In another embodiment, images can be retrieved from a server and processed locally by logic on the client device for display. In other embodiments, some variations in the sequence of the steps are possible, and there may be additional steps or omitted steps.

In step 1400, the Recursive Magnifier at a client device receives a request to view an image from a user at or software running on a client device on which the image is to be displayed, or a user or software on another device. To process the request, the Recursive Magnifier establishes a first context covering the entire portion of the image that is to be viewed, which can be the whole image (step 1410). The first context, called the root context, has an associated first quantum. The Recursive Magnifier can also invoke a high-resolution image viewing logic for displaying portions of the high-resolution images at resolution levels within the first quantum. In an alternative embodiment, the first context can be a descendant of the root context.

The Recursive Magnifier can retrieve and display the first base image on the client device within the display area allocated for viewing the base image on the client device (see FIGS. 2 through 13). The first base image provides a visual frame of reference for areas of interest within the context's region. It is displayed at a base resolution, a resolution level that is consistent with providing such a frame of reference and that is also based on the characteristics and capabilities of the client device and other factors. The display area for the base image can be of a size that differs from that of the first base image at its retrieved or generated resolution level, and the Recursive Magnifier can perform scaling or other processing to the image to fit it to the display area, or display a portion of the base image, cropping it or hiding the non-displayed portion.

In one embodiment, to retrieve the base image, the Recursive Magnifier first sends a request to a server over a network for the base image. (As used herein, a server can be any device on which the image is captured, input, generated, stored, etc.) With the request, in addition to an image identifier, the Recursive Magnifier can send additional information specifying the requested resolution and other parameters describing the base image. Other parameters can, for example, include the depth, angle for viewing (e.g., for a three dimensional image), color or grayscale parameters (e.g., color maps, window/level on a radiology image), transforms to be performed, image formatting, a point in time or time range (e.g., for content that changes in time or video), and other parameters.

In an embodiment, the Recursive Magnifier can precede the sending of the request for the base image with a request sent to the server or other client components for image information. It can then use the received image information to set up the display area and determine the high-resolution viewing parameters, as well as parameters for requesting the base and high-resolution images. In retrieving and displaying the base image, the Recursive Magnifier can take into account characteristics or resources available on the client device, including display size, window size, memory size, processing power, network speed, network quality, transmission quotas, transmission costs, etc., as well as capabilities of the server and network, and characteristics of the image.

In an embodiment, the Recursive Magnifier can retrieve a base image or portion thereof whose resolution level matches what will fit in the display area for the base image. In another embodiment, the Recursive Magnifier can retrieve a base image whose resolution level is less than the size of the display area for the base image and either scale it to fit the available display area or reduce the size of the display area. In another embodiment, the Recursive Magnifier can retrieve a base image at a resolution level higher than will fit in the available display space to accommodate window or display area resizing, or to display a portion of the base image within the available display area or viewport and allow for panning of the base image, or for other reasons. It may then downscale, crop, or hide the overflow of the received image in displaying it as the base image. In another embodiment, the Recursive Magnifier may request a base image that is at a resolution level higher than will fit in the available display area as a method of pre-fetching an image from which high-resolution images for the first or other contexts or base images for other contexts can be generated. In this case, the Recursive Magnifier can downscale the retrieved image to fit the available display space for the first base image, and by using the retrieved base image to generate a high-resolution image or a base image for another context, save network bandwidth and server load at the expense of increased time for the base image to be retrieved.

In an embodiment, after retrieving the first base image, the Recursive Magnifier can apply any needed or requested algorithms or logic to process the base image prior to display. These include decryption, decompression, formatting, scaling, cropping, depth selection, and other image processing methods such as color or grayscale transforms, transparency adjustments, rotations (two or three dimensional), rasterization, ray tracing, decluttering, or other image processing. In another embodiment, the Recursive Magnifier can retrieve the first base image from client device memory or storage, an input device on the client, or image generation or image processing logic on the client (which may have retrieved the image from a server prior to processing it for display).

After retrieving the base image, the Recursive Magnifier can display at least a portion of it in the available display area on the client device display. The user or software logic can indicate that changes be made to the base image display area position or size, or can scroll the display area, and the Recursive Magnifier can perform the requested changes to the base image display, and can modify the configuration of the high-resolution image viewers that it invokes, in order to service the display area changes.

As part of establishing the first context, the Recursive Magnifier invokes high-resolution image viewing logic to display areas of interest within the image at user-indicated positions in higher resolution than the first base image, over the range of resolution levels within the first quantum. In invoking the high-resolution image viewing logic, the Recursive Magnifier can specify configuration parameters for it. In one embodiment, these can include the quantum specification, including the range of resolution levels to be displayed, and when the quantum comprises a discrete set of resolution levels, each resolution level or the increment between them. These can also include parameters that the high-resolution image viewing logic can send to the server in requesting the image (which could be of the form of Uniform Resource Locators (URLs) of the context's images on the server or of the server page that processes image requests, or parameters in another form), and actions to be performed in response to user commands or actions. In an embodiment, such actions can include a function, subroutine, or other logic to be invoked within the Recursive Magnifier when the user requests an area of interest to be displayed at a resolution level outside the resolution level range of the quantum. In an embodiment, these can include requests to the Recursive Magnifier to transform the base image. In an embodiment, these can include requests to the Recursive Magnifier to pan the base image or a high-resolution image.

In step 1420, a user request is received to view an area of interest at a resolution level within the first quantum at a user-indicated position within the first context's region. The position can be anywhere within the first context's region.

In an embodiment, the user can indicate the position of the area of interest using a pointing device (e.g., a mouse, joystick, track ball, track pad, touch screen, etc.). In an embodiment, the user can indicate the position of the area of interest using a pointing device on the displayed first base image. In an embodiment, when a portion of a high-resolution image for the first context is displayed (e.g., in step 1440), the user can indicate the position of the area of interest using a pointing device on the displayed portion of the high-resolution image for the first context. This can be used in retrieving a high-resolution image at another resolution level. In an embodiment, methods of indicating the position of the area of interest using a pointing device include but are not limited to positioning a cursor with at pointing device, pressing one or more buttons, touching the display, dragging or drawing a shape such as a circle, oval, rectangle, polygon, magnifying-glass shape, or other shape over the position, or panning a displayed base or high-resolution image.

In another embodiment, the user can enter coordinates within the first context's region of a designated point within the area of interest (e.g., the center point, the top-left point, or another point of interest within the area of interest). The coordinates can be the number of pixels or percentages from horizontal and vertical references such as the left and the top edges of the image, or comparable values (e.g., 30% from the left edge and 40% from the top edge).

In another embodiment, the user can enter a description of the position of the area of interest or a designated point within the area of interest (e.g., on a map, an address, geographic feature, latitude, longitude, elevation, or time).

In an embodiment, another user at another client device can provide the indication of the position of the area of interest on behalf of the user on whose client device the image is displayed, and can otherwise control part or all of the operation of the Recursive Magnifier.

In another embodiment, the position of the area of interest can be determined via an algorithm.

In an embodiment, the area of interest can be moved to another position within the first context's region.

In an embodiment, the width and height of the area of interest can be specified by the user, either directly or indirectly (e.g., in an embodiment, derived from the size of the display area for high-resolution images). In an embodiment, the width and height can be determined by the Recursive Magnifier.

The area of interest typically surrounds the user-indicated position, but does not necessarily do so evenly or on all sides (e.g., when the position is at or near an edge of the first base image). The user-indicated position may or may not be centered within the area of interest. In an embodiment, the user can indicate the size, shape, or the position of the boundaries of the area of interest relative to the user-indicated position. In an embodiment, the Recursive Magnifier can determine the size, shape, or the position of the boundaries of the area of interest relative to the user-indicated position.

The Recursive Magnifier can enable the user to indicate the position of an area of interest using a variety of reference objects. These include a base image, a high-resolution image, or display areas containing a base image or high-resolution image, the client device display, or another object. Once the Recursive Magnifier receives the position indication, it can normalize it for the image, and apply it to any type of image-related object. For example, if the user indicates the position of the area of interest using a pointing device on a displayed base image, the Recursive Magnifier can compute, from the coordinates on the display corresponding to the cursor position, the coordinates within the image relative to a reference point. For example, in an embodiment, if the user clicks on the display near the center of a 600×400 base image for the first context, the Recursive Magnifier can determine that the user clicked within the display area for the base image, 276 pixels from the left edge and 220 pixels from the top edge of the base image. This is equivalent to 46% from the left edge and 55% from the top edge. These percentages can be applied in generating high-resolution images corresponding to the area of interest at the user-indicated position, or for advancing to a second context. In the second context, the position of the second context's region within the image can also be taken into account if, for example, the user were to click on the second base image to indicate the position of another area of interest. In other embodiments, the computational steps and methods can differ (e.g., using the center point as the reference point rather then the left-top), but they are all essentially equivalent.

To service the user request from step 1420, the high-resolution image viewing logic retrieves the high-resolution image (step 1430). In one embodiment, it can send a request to the server over a network for a high-resolution image. The request can include parameters including an image identifier, resolution level, transform to be performed, format, and other parameters. The server processes the request and sends the requested high-resolution image to the client device. The high-resolution image viewing logic on the client device receives the high-resolution image, optionally, as necessary: performs an algorithm on it (e.g., decryption or decompression), crops it, transforms it, parses the format, or performs other image processing or image generation methods on the received image. The Recursive Magnifier displays a portion of the high-resolution image corresponding to the area of interest on the client device display (step 1440).

In another embodiment, the high-resolution image viewing logic can provide or generate the high-resolution image from an image previously received from the server. This can be done, for example, for a high-resolution image when the base image retrieved in step 1410 is of a resolution that equals or exceeds that of the high-resolution image, according to a method previously presented in the discussion on step 1410. In another embodiment, the high-resolution image can be retrieved (step 1430) from client-device memory or storage, an input device on the client, or image generation or image processing logic on the client.

In an embodiment, the retrieved high-resolution image (step 1430) can encompass the entire region for the first context. This enables fast inspection of any portion of the first base image in the resolution of the high-resolution image without the delays associated with high-resolution image retrieval, further enabling identification of areas of interest for inspection at even higher resolutions. In an embodiment, the retrieved high-resolution image can cover a region within the first context's region that includes the area of interest. In another embodiment, the retrieved high-resolution image can include a region larger than the first context's region. This can be useful if the position of the area of interest is near the edge of the first context's region.

The high-resolution image, or a portion thereof, can be displayed in the allocated display area on the client device (step 1440). Typically, the size of a high-resolution image covering the full image exceeds the size of the available display space, and only a portion of the high-resolution image is displayed.

In an embodiment, the area or interest or user-indicated position from step 1420, or the region corresponding to the displayed portion of the high-resolution image, can be demarcated on the first base image.

In some embodiments, steps 1420 through 1440 can be omitted, and viewing high-resolution images is not performed in the first context. Instead, the first context is basically used for advancing to the second.

In step 1450, a request is received from the user that results in advancing to a second context for an area of interest at a user-indicated position, for viewing the image at the resolutions within the second quantum. The area of interest can be the same as in step 1420, or can be different. The user can indicate the position of the area of interest according to methods described in step 1420.

In one embodiment, the user can request in step 1450 a resolution level increase beyond the range of the first context's quantum, and the Recursive Magnifier can automatically advance to the second context. In another embodiment, the user can explicitly request advancing to the second context.

In response to the request, the Recursive Magnifier establishes a second context (step 1460) that is a child of the first context for a smaller region that includes the area of interest from step 1450. As part of establishing the second context, the Recursive Magnifier can display at least a portion of a second base image for the second context's region in an area of the display. In one embodiment, the display area used for the second base image can be the same as for the first base image, in which case the second base image overlays or replaces the first base image. In another embodiment, the display area used for the second base image can be a different area on the display than that of the first base image, in which case both the first base image and second base image can be visible at the same time.

In an embodiment, the Recursive Magnifier can determine the dimensions of the second base image, as well as the second base image's position on the display relative to the first base image. In an embodiment, the Recursive Magnifier can align the second base image such that it is displayed within the same display area as the first base image, overlaying or replacing part or all of the first base image on the display. In an embodiment, the Recursive Magnifier can align the second base image relative to the first such that, at the user-indicated position in step 1450, a point within the second base image matches a point in the underlying or replaced first base image. The position may not be centered within the first base image, and it also may not be centered within the second base image.

Further, the width and height of the second base image can be determined as appropriate for the application. In an embodiment, the second base image can be of the same width and height as the first base image, completely overlaying or replacing it on the display. This provides efficient use of the display area and a good user experience for many applications. In an embodiment, the size or aspect ratio of the second base image can differ from that of the first. For example, the aspect ratio of the full image for a Pathology whole-slide scan is approximately 3:1, but areas of interest to be viewed on the slide may have an aspect ratio of approximately 1:1. In the case that the second base image does not completely overlay all of the first base image, it can be demarcated from the first base image via methods including rendering a border around the second base image, or partially or fully obscuring any exposed portions of the first base image.

The second base image can be generated from a previously retrieved image or can be retrieved. In an embodiment, the second base image can be generated from the first base image. In an embodiment, the second base image can be generated from a high-resolution image. In an embodiment, the second base image can be retrieved from the server. In an embodiment, the second base image can be retrieved from another component on the client device. In an embodiment, the second base image can be generated from retrieved content.

In an embodiment, the Recursive Magnifier can use the capabilities of the high-resolution image viewing logic for the first quantum to select the portion of the high-resolution image to be used for the second base image and to render the second base image. For example, using the aforementioned OpusZoom® Magnifier as the high-resolution image viewer, a virtual lens showing a portion of the high-resolution image can be positioned over the area of interest such that, at the user-indicated position of the area of interest, a point within the high-resolution image matches a point in the underlying first base image. The OpusZoom® Magnifier further provides a capability for the user or for client software invoking it to command that the lens size be expanded to completely cover the first base image while maintaining the alignment of the high-resolution image relative to the first base image at the user-indicated position on the display. Thus, the OpusZoom® Magnifier can render the second base image within the display area.

In an embodiment, the second context's region can include an extension area to accommodate extending over the edge of the context's region when areas of interest are selected near the edge for display in high resolution or for advancing to the next context. In an embodiment, the extension area can be included in the context's region when the context is established. In an embodiment, the extension area can be dynamically added after the context is established. In one embodiment, the base image can include the extension area. In an embodiment, the included extension area can be demarcated. In an embodiment, the base image area can be panned to expose the extension area. In another embodiment, the base image can exclude the extension area. In an embodiment, the base image can be retrieved without the excluded extension area. In an embodiment, the Recursive Magnifier can crop the retrieved base image to remove the extension area.

In an embodiment, the Recursive Magnifier can demarcate within the second base image the area of interest or user-indicated position from step 1450. In an embodiment, when the first base image is displayed along with the second base image, or upon reversion from the second context (see discussion for FIG. 15), the Recursive Magnifier can demarcate within the first base image the area of interest or user-indicated position from step 1450. In an embodiment, the Recursive Magnifier can also demarcate within the first base image the second context's region.

The Recursive Magnifier can determine a resolution level range for the second context's quantum. While the resolution level range of a child context and its parent can overlap, the overarching direction is that, as one goes deeper in the context hierarchy away from the root context, the resolution levels increase up to the maximum resolution. The increase is a trend over the full extent of the context hierarchy from the root context through its descendants to a leaf context (in which the quantum includes the maximum resolution). Thus, as one traverses deeper into the context hierarchy, a context's resolution levels tend to increase while the region covered decreases, keeping the sizes of the high-resolution images retrieved across contexts roughly the same. In an embodiment, the resolution range of a child context can extend higher than that of its parent. This is the typical scenario. In an embodiment, the resolution range of a parent context can extend up to or beyond that of one or more of its children. This can be useful in some scenarios.

As part of establishing the second context, the Recursive Magnifier can invoke high-resolution image viewing logic for the second context enabling viewing of user-indicated areas of interest within the second context at resolutions within the range of resolution levels in the second quantum. The high-resolution image viewing logic for the second context can be the same logic as the first, or it can be different high-resolution image viewing logic. In an embodiment, the Recursive Magnifier can suspend the operation of or deactivate the first high-resolution image viewer prior to invoking the second. This may be necessary if, for example, the first invocation of the high-resolution image viewer incorporated user controls or event handlers (e.g., for user inputs such as clicking on the image, moving the mouse, or touch gestures) that operate over the same display area within which the second invocation of the high-resolution image viewer will operate.

Configuration parameters for the second invocation of high-resolution image viewing logic can include the resolution level of the second base image, the portion of the image in the second context's region, the resolution level range for the second context's quantum, and the discrete resolution levels within the second quantum when a discrete set of resolution levels is used, parameters for requesting the high-resolution images within the resolution level range of the second quantum (e.g., the URL(s) on the server for the high-resolution images or parameters to send to the server in the image requests), and other parameters. The configuration parameters can alternatively include other values from which the aforementioned values can be derived.

In an embodiment, a high-resolution image within the second context can be retrieved or generated and a portion of it corresponding to the area of interest at the user-indicated position can be displayed. In an embodiment, a digital zoom of a portion of the high-resolution image can be displayed for the area of interest in a display area in which high-resolution images are displayed, showing a magnified view of the area of interest, magnified to match a resolution level within the second context's quantum. The digitally zoomed image can be replaced by a portion of a high-resolution image at the resolution level within the second context's quantum received from the server when the download from the server completes.

Within the second context's region, the user can select points of interest for viewing in higher resolution than the second base image, within the resolution level range of the second context's quantum. Steps 1470, 1480, and 1490 describe receiving a request to view an area of interest within the second context in high resolution at a user indicated position, retrieving the high-resolution image, and displaying the high-resolution image. Processing is comparable to the corresponding first context steps 1420, 1430, and 1440, but for the second context. Since, the high-resolution images in contexts beyond the first cover only a portion of the whole image corresponding to the context's region, downloading them can be relatively fast compared to downloading a high-resolution image corresponding to the whole image.

Child contexts can be repeatedly established, as in steps 1450 and 1460, for a third context that is a descendant of the second, and beyond. Areas of interest within each subsequent child context can be viewed in higher resolution than the parent, for a smaller region. The process can continue until the resolution is sufficient for the user's needs, or the maximum resolution at which the image was captured, input, or generated is reached. In an embodiment, if the maximum resolution is reached, a digital zoom can be provided to show the image magnified beyond the maximum resolution.

In an embodiment, controls can be provided that enable a user to request extending the resolution level range within a quantum to include higher resolutions. Alternatively, the Recursive Magnifier can automatically extend a quantum's resolution level range. Extending the range may be useful when, for example, the user desires to stay within the region associated with a context and inspect areas within it at resolution levels above the quantum's upper limit, rather than advance to a child context covering a smaller region.

The Recursive Magnifier can save the steps and associated parameters required to zoom into areas of interest of an image through multiple contexts for later use by the user or other users. The steps may be cached or saved in the client device's memory, or stored on the server for later retrieval or replay by the user or another authorized user. The Recursive Magnifier can also provide a capability for the user to enter and save annotations for areas of interest. Such annotations can be stored on the server for later retrieval by the user or another authorized user. The Recursive Magnifier can also provide a capability to output views of areas of interests, with any annotations, to a file or a printer.

The Recursive Magnifier can also provide a capability to change the base images and high-resolution images displayed within a context to those for a second image (usually related to the first image). For example, the Recursive Magnifier can enable the user to request display of transformations to the image (e.g., color or grayscale transforms), two or three dimensional rotations, depth changes, changes in time (e.g. for video or time-dependent content), or other changes. For video or time-dependent content, changes can be synchronized across affected images according to a time source. In an embodiment, the image changes can be made for only the portion of the high-resolution image currently being displayed. In an embodiment, the image changes can be made for any or for all of the base images and high-resolution images in the current and previous contexts. For example, the user may be a Pathologist viewing a whole-slide scan who needs to change the depth layer at a particular position in the image to improve the focus at the area of interest being viewed in high-resolution. In this case, the depth change may only apply to the portion of the high-resolution image corresponding to the area of interest at that position. Outside that area, a different depth can be selected. In an embodiment, the new images can be retrieved from the server. In an embodiment, the new images can be provided by a component or components on the client device.

Figure 15:
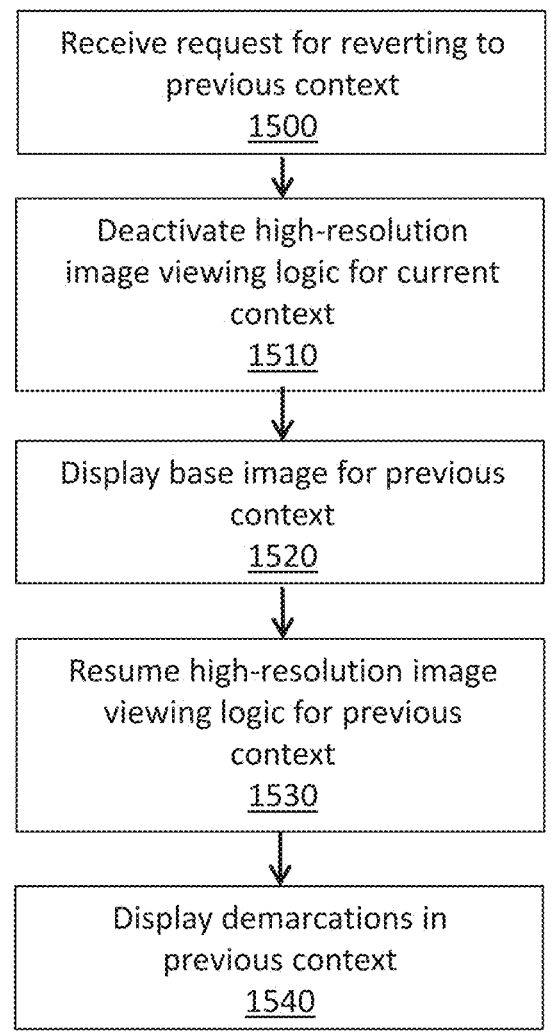
FIG. 15 is a flow diagram illustrating methods for reverting from one context to a previous context, according to an embodiment.

After the user has advanced to a second or subsequent context, the user may desire to revert to a previous context to view a larger portion of the image, or to examine a different region in high resolution. FIG. 15 is a flow diagram illustrating methods for reverting from one context to a previous (i.e. ancestor) context, according to an embodiment. Reverting can be useful for providing a context covering a larger region of the image, or for navigating to a different region within the image.

In step 1500, a request is received for reverting to the previous context. In an embodiment, user can request a resolution decrease below the minimum resolution within the current context. In another embodiment, the user can explicitly request reverting to the previous context. In an embodiment, reverting can result from a user action (e.g., panning to the edge of a context). In an embodiment, reverting as a result of a user action or request can be followed by automatic advancing to another child context.

Once the request to revert has been received, the Recursive Magnifier deactivates the current invocation of the high-resolution image viewing logic (step 1510). Deactivating can include removing or deactivating any event handlers for user actions and removing or hiding any displayed images or objects.

The Recursive Magnifier then displays the base image for the previous context (step 1520), and resumes or reactivates the previous invocation of the high-resolution image viewing logic (step 1530). These steps can be performed in either order. In an embodiment, the previous high-resolution image viewing logic had displayed the current base image from a portion of the high-resolution image that it downloaded. Such a scenario was described above in an example in which the previous high-resolution image viewer is the OpusZoom® Magnifier, and its virtual lens was expanded over the previous base image to provide the current base image. In this case, the Recursive Magnifier can command the high-resolution image viewer to reduce the size of the virtual lens in order to show part of the base image for the previous quantum, with a portion of the high-resolution image with a resolution matching the resolution of the current context's base image displayed in the virtual lens.

The Recursive Magnifier then displays demarcations in the previous context's base image or the previous context's high-resolution image (step 1540).

In an embodiment, upon reverting the Recursive Magnifier can restore demarcation(s) from the previous context that were displayed prior to advancing to the current context. For example, if the user had been viewing an area of interest at a user-indicated position in high-resolution at a resolution level within the previous quantum, the corresponding portion of the high-resolution image can be restored, and the area of interest, user-indicated position, or the region corresponding to the portion of the high-resolution image can be demarcated in the previous context's base image.

In an embodiment, the Recursive Magnifier can demarcate within the previous context's base image the region corresponding to the current context, or the area of interest at the user-indicated position that the current context's region contains, or the user-indicated position for the area of interest.

In an embodiment, the Recursive Magnifier can transfer demarcation(s) displayed in the current context to the previous context. For example, if the a portion of a high-resolution image were being displayed in the current context for an area of interest at a user indicated position, the area of interest, user-indicated position, or region corresponding to the portion of the high-resolution image can be demarcated in the previous context's base image. In addition, a high-resolution image at a resolution level with the previous quantum for the same area of interest can be displayed.

In an embodiment, when, for example, the previous high-resolution image viewer is the OpusZoom® Magnifier, the Recursive Magnifier can use the high resolution image viewer's API to command that the virtual lens be moved to a position relative to the base image from the previous context that corresponds to the position of the virtual lens relative to the base image in the current context so that a matching point is shown (e.g., as in a previous example, the tip of the beak of a bird) in a high-resolution within the resolution level range for the previous context. In an embodiment, the resolution level displayed in the virtual lens can be the highest resolution for the previous context or another resolution within the context. The Recursive Magnifier can also command the high-resolution image viewer to resize the virtual lens in the previous context to correspond to the virtual lens size in the current context. To do this, the Recursive Magnifier can query the high-resolution image viewer for the current context prior to deactivating it as to the current position and size or coordinates of the virtual lens.

The above methods enable the user to revert to any previous context from which the current context was reached, or revert all the way back to the first context (covering the whole image). In an embodiment, the Recursive Magnifier can provide controls for the user to request reverting one context, all the way to the first context, or to any context in between. The controls can include, but are not limited to, soft buttons, hardware buttons or switches, menus, other pointer device controls, or touch gestures such as swiping down or up or moving a finger over a touch screen. In an embodiment, reversion can automatically be performed when the user requests a resolution decrease below the resolution range of the high-resolution images within the context's quantum or when the user requests another action.

Using the methods described above, the user can effectively and efficiently view images of arbitrarily high resolution. The methods provide for successive refinement enabling the user to view areas of interest in high-resolution while preserving context and keeping the response time experienced by the user within acceptable limits. Via parameters, the Recursive Magnifier can configure the contexts traversed by the user, including the contexts' region and quantum, considering available client display area, network transmission times, client device processing capabilities, and server load, to provide an the overall beneficial user experience. When the resolution of high-resolution images within a context reaches the limits of acceptable performance, a new context can be established on a smaller region of the image, essentially resetting the network transmission and processing times to those of the previous context, in order to display a portion of the image in a higher resolution. The user must go through multiple steps to get to the resolution level he/she requires, but each step is responsive and, the steps further enable the user to refine the position of the area of interest or examine multiple areas of interest. Thus, for example, if each context represents a resolution level increase by a factor of 4, traversing only 5 contexts can provide an overall resolution level increase of 1000-fold ($4^{5=1024}$).

An additional user experience benefit is derived from the Recursive Magnifier's ability to use the same display area for parent and child contexts, enabling use on any size client device display, including displays as small as a smart phone. In an embodiment, the user experience is further enhanced through the alignment of user-indicated positions for areas of interest across contexts, preventing the disorientation caused by a user-indicated position for an area of interest being shown at a different display position when traversing the context hierarchy, or from being hidden due to moving outside the display area. In an embodiment, the Recursive Magnifier can further enhance performance and usability by enabling the size of the display area within which it operates to be adjusted, either by the user or automatically, based on client device capabilities, network performance, usability considerations, and other factors. In an embodiment, the Recursive Magnifier can use only a portion of the client device display to allow for showing other information alongside of the image shown with the Recursive Magnifier. In an embodiment, the Recursive Magnifier can enable the user to resize the display area. In an embodiment, the Recursive Magnifier can show different images or different views of the same image (e.g., with transformed colors or gray-shades, or 3D-rotated) side-by-side. In an embodiment, the Recursive Magnifier can optimize response times by pre-fetching images or portions thereof at resolution levels that the user is likely to request.

Example Embodiment

Figure 16:
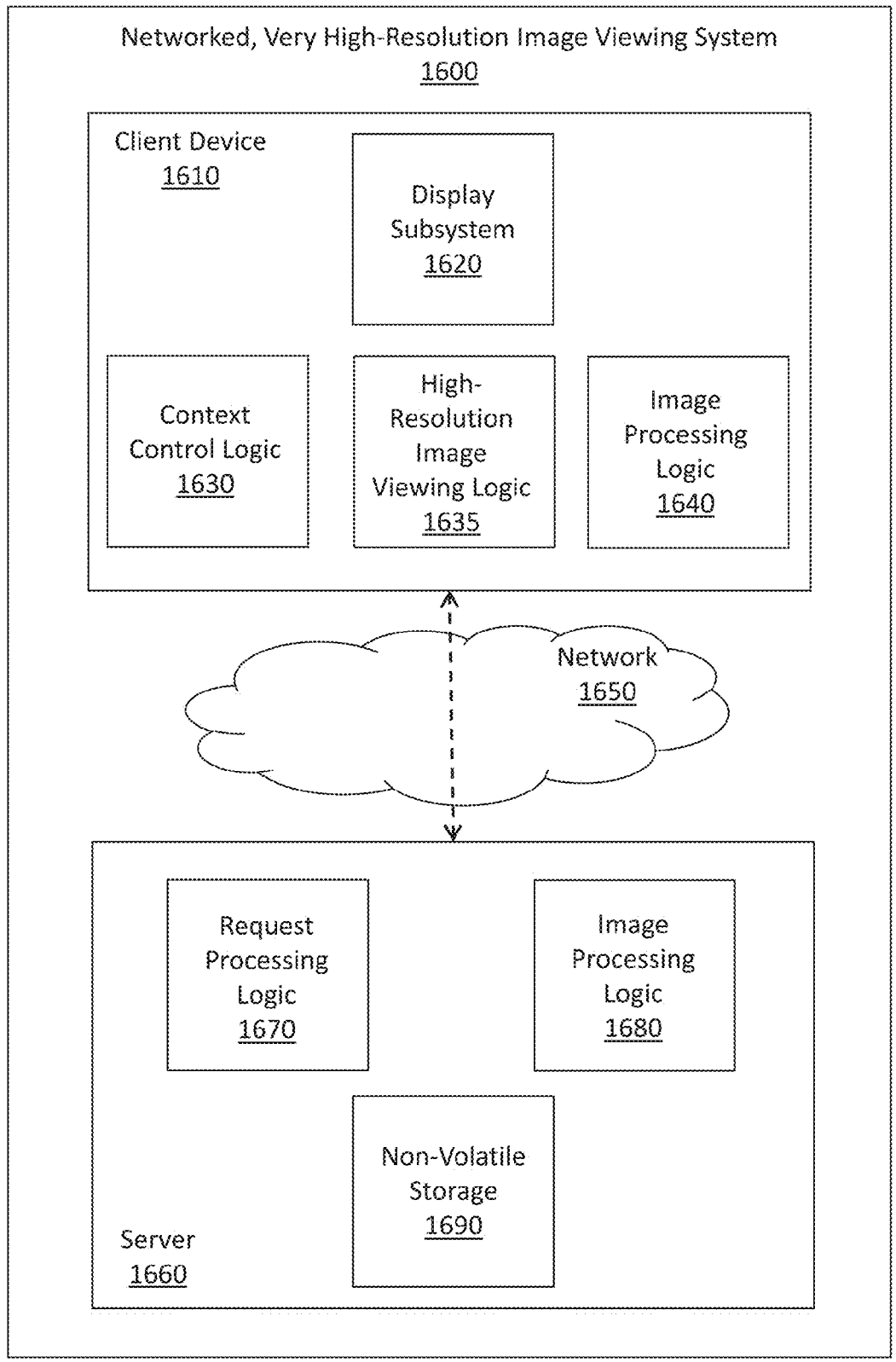
FIG. 16 illustrates a networked, high-resolution image viewing system, according to an embodiment.

FIG. 16 depicts a networked, very high-resolution image viewing system 1600, according to an embodiment. Shown in FIG. 16 are client device 1610 and server 1660, and a network 1650 interconnecting them. In an alternative embodiment, rather than divide the functionality between a client device and server communicating over a network, client device 1610 and server 1660 functionality described herein can be resident in a single computing device or cluster of computing devices. In another embodiment, client device 1610 may be a thin client with the display subsystem 1620 and a network interface, and the other client functionality shown in FIG. 16 can reside on server 1660. One skilled in the art will appreciate that there are numerous methods to decompose the functionality and allocate functions to components. The architecture depicted in FIG. 16 is only a small subset of possible methods, and is presented for illustrative and descriptive purposes.

Within client device 1610 are display subsystem 1620, context control logic 1630, high-resolution image viewing logic 1635, and image processing logic 1640. Display subsystem 1620 comprises the display device, graphics controller logic, associated display memory, and display control software. The context control logic 1630 invokes and configures the high-resolution image viewing logic 1635. The high-resolution image viewing logic 1635 displays portions of images in high resolution, including decompression, scaling, and cropping of images, and positioning images within the display area. The image processing logic 1640 performs additional image processing functions including transforms (e.g., color or grayscale), changing the window or level in a Radiology image, two or three-dimensional rotations, decryption, and other image processing. The architecture allows for image processing to be performed either on the client device 1610 or on the server 1660, or distributed between them, to enable optimizing the application taking into account client capabilities, network performance, server response times, and other factors. Either the high-resolution image viewing logic 1635, the context control logic 1630, or the image processing logic 1640 can send requests to the server 1660 for images or portions of images at different resolutions, as well as for information associated with an image, over network 1650. In an embodiment, the context control logic can also replace images in an active invocation of a high-resolution image viewer with new images either received from the server or generated by the image processing logic. This is useful, for example, if the user requests a transformation or other image processing operation be performed (e.g., a window or level change in a radiology image, or a three dimensional rotation), or if the user requests changing the depth in a Pathology whole-slide scan to improve the focus for an area of interest.

Network 1650 can be the Internet, another wide-area network, a metropolitan area network, a local area network, a computer-to-computer interconnect, or a bus. It can be wireless, wired, or a combination thereof. Transmission speeds, latency, error rates, and other characteristics can vary and are assumed to be within acceptable limits for the image and data transmissions of the networked, very high-resolution image viewing system 1600.

Within server 1660 are request processing logic 1670, image processing logic 1680, and non-volatile storage 1690. The request processing logic 1670 receives requests from client device 1610 over network 1650 and invokes the image processing logic 1680 or retrieves requested images from non-volatile storage 1690. The image processing logic 1680 retrieves requested images from non-volatile storage 1690 or an input device, and processes the images to fulfill the requests. Processing can include scaling, cropping, compressing and decompressing, encrypting and decrypting, performing image transformations, performing projections such as in three-dimensional rotations, color or grayscale transformations, changing the window or level in a Radiology image, formatting, or other image processing functions. The architecture allows for image processing to be performed on the client device 1610 as well as on the server 1660 in any functional distribution or combination suitable for an application. Non-volatile storage 1690 can be storage physically within server 1660 or network storage. Stored within the non-volatile storage 1690 can be images at the maximum resolution at which the images are captured, input, or generated. In an embodiment, also stored within the non-volatile memory can be images at lower resolution levels than the maximum, or transformed images. Storing lower-resolution images or transformed or pre-processed images in addition to the maximum resolution images can be a method of reducing server load and processing times for viewing the images in high-resolution. In an embodiment, an image can be segmented for storage and processing. When such a method is used, the image processing logic 1680 can retrieve the segments needed to fulfill a user request. If only a portion of a segment is needed, the image processing logic 1680 can extract that portion. From the retrieved segments or portions of segments, the image processing logic 1680 can compose an image to send to the client device 1610. The image processing logic 1680 can perform any necessary processing on the segments individually and/or after they are composed. Alternatively, segments can be transmitted to the client device 1610 and composed and processed by the image processing logic 1640 on the client device 1610.

System Overview

As discussed above, FIG. 16 illustrates an example system for high-resolution imageF viewing, according to an embodiment. The system may comprise a set of one or more servers 1660 (also referred to herein as a "platform") which host and/or execute one or more of the various functions, processes, and/or software modules described herein. In addition, server(s) 1660 are communicatively connected to one or more user systems 1610 via one or more network(s) 1650. Network(s) 1650 may comprise the Internet, and server(s) 1660 may communicate with user system(s) 1610 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. In an embodiment, server(s) 1660 may not be dedicated servers, and may instead be cloud instances, which utilize shared resources of one or more servers. It should also be understood that server(s) 1660 may be, but are not required to be, collocated. Furthermore, while server(s) 1660 are illustrated as being connected to user system(s) 1610 through a single set of network(s) 1650, it should be understood that the server(s) 1660 may be connected to the various systems via different sets of one or more networks. For example, server(s) 1660 may be connected to a subset of user system(s) 1610 via the Internet, but may be connected to one or more other user system(s) 1610 via an intranet. It should also be understood that user system(s) 1610 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, Automated Teller Machines, and the like. In addition, while only a single user system 1610 and one set of server(s) 1660 are illustrated, it should be understood that the network may comprise any number of user systems and sets of server(s).

Platform 1660 may comprise web servers which host one or more websites or web services. In embodiments in which a website is provided, the website may comprise one or more user interfaces, including, for example, webpages generated in HyperText Markup Language (HTML) or other language. Platform 1660 transmits or serves these user interfaces in response to requests from user system(s) 1610. In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to platform 1660 and the responses from platform 1660, including the user interfaces, may both be communicated through network(s) 1650, which may include the Internet, using standard communication protocols (e.g., HTTP, HTTPS). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (not shown) that are locally and/or remotely accessible to platform 1660. Platform 1660 may also respond to other requests from user system(s) 1610.

Platform 1660 may further comprise, be communicatively coupled with, or otherwise have access to one or more database(s). For example, platform 1660 may comprise one or more database servers which manage one or more databases. A user system 1610 or application executing on platform 1660 may submit data (e.g., user data, form data, etc.) to be stored in the database(s), and/or request access to data stored in such database(s). Any suitable database may be utilized, including without limitation MySQL, Oracle, IBM, Microsoft SQL, Sybase, Access, and the like, including cloud-based database instances. Data may be sent to platform 1660, for instance, using the well-known POST request supported by HTTP, via FTP, etc. This data, as well as other requests, may be handled, for example, by server-side web technology, such as a servlet or other software module, executed by platform 1660.

In embodiments in which a web service is provided, platform 1660 may receive requests from user system(s) 1610, and provide responses in eXtensible Markup Language (XML) and/or any other suitable or desired format. In such embodiments, platform 1660 may provide an application programming interface (API) which defines the manner in which user system(s) 1610 may interact with the web service. Thus, user system(s) 1610, which may themselves be servers, can define their own user interfaces, and rely on the web service to implement the backend processes, functionality, storage, etc., described herein. For example, in such an embodiment, a client application executing on one or more user system(s) 1610 may interact with a server application executing on platform 1660 to execute one or more or a portion of one or more of the various functions, processes, and/or software modules described herein. The client application may be "thin," in which case processing is primarily carried out server-side by platform 1660. A simple example of a thin client application is a browser application, which simply requests, receives, and renders web pages at user system(s) 1610, while platform 1660 is responsible for generating the web pages and managing database functions. Alternatively, the client application may be "thick," in which case processing is primarily carried out client-side by user system(s) 1610. It should be understood that the client application may perform an amount of processing, relative to platform 1660, at any point along this spectrum between "thin" and "thick," depending on the design goals of the particular implementation. In any case, the application, which may wholly reside on either platform 1660 or user system(s) 1610 or be distributed between platform 1660 or user system(s) 1610, can comprise one or more executable software modules that implement one or more of the processes or functions of the application(s) described herein.

Example Processing Device

Figure 17:
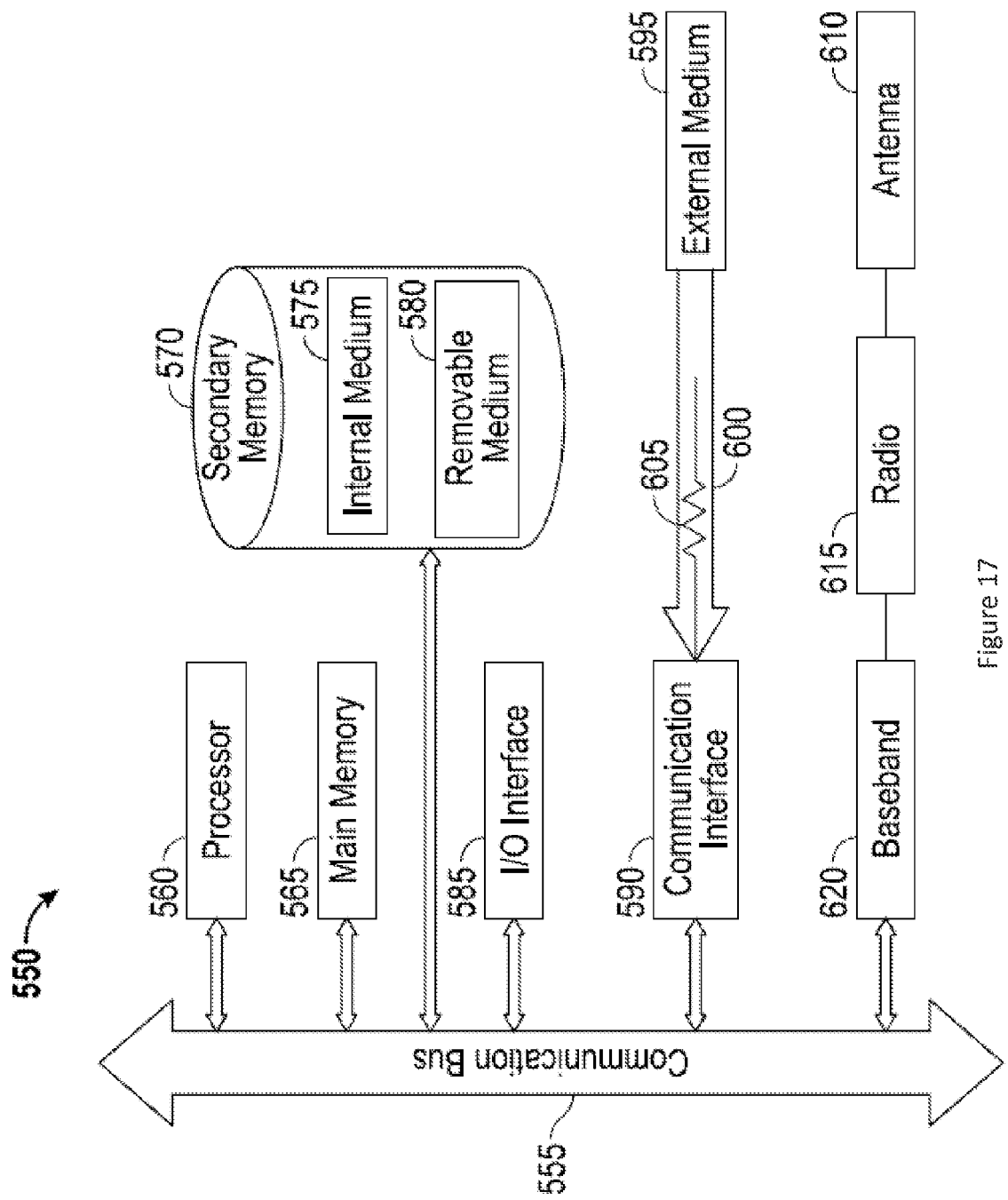
FIG. 17 illustrates an example processing system on which one or more of the processes described herein may be executed, according to an embodiment.

FIG. 17 is a block diagram illustrating an example wired or wireless system 550 that may be used in connection with various embodiments described herein. For example the system 550 may be used as or in conjunction with one or more of the mechanisms or processes described above, and may represent components of server(s) 1660, user system(s) 1610, and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7®, processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, C#, Java, JavaScript, Perl, Visual Basic, .NET, PHP, Python, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. other processing systems, printers, external storage devices, etc.), networks, or information sources. For example, computer software or executable code may be transferred to system 550 from a network server via communication interface 590. It should be understood that these transfers may be unidirectional or bidirectional. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 firewire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for high-resolution image viewing, wherein the method comprises, by one or more hardware processors:

displaying a first image in a display area on a display of a device, wherein the first image comprises a first region that includes at least a portion of an image, at a first resolution level;

receiving a first user indication, wherein the first user indication includes an indication of a first position within the first region;

in response to the first user indication, displaying a first virtual lens containing a second image on the display of the device overlaid on the first image over the first position, wherein the second image comprises a second region that includes at least a portion of the first region, at a second resolution level which is higher than the first resolution level, and wherein the second region includes the first position;

receiving a second user indication; and, in response to the second user indication, expanding the size of the first virtual lens, the second image, and the second region and displaying on the display of the device the expanded first virtual lens containing the expanded second image at the second resolution level overlaid on the first image at the first position; and displaying a second virtual lens containing a third image on the display of the device overlaid on the second image over the first position, wherein the third image comprises a third region that includes at least a portion of the second region, at a third resolution level which is higher than the second resolution level, and wherein the third region includes the first position.

2. The method of claim 1, further comprising receiving one or more of the first image, the second image, and the third image over a network.

3. The method of claim 2, further comprising requesting over the network the one or more of the first image, the second image, and the third image.

4. The method of claim 1, further comprising generating one or more of the first image, the second image, and the third image from content received over a network.

5. The method of claim 4, further comprising requesting over the network the content for generating the one or more of the first image, the second image, and the third image.

6. The method of claim 1, further comprising demarcating on the display, within the first image, the first virtual lens.

7. The method of claim 1, further comprising demarcating on the display, within the second image, the second virtual lens.

8. The method of claim 1, wherein one or more of a size, shape, position, and resolution level of the first image, the second image, and the third image are selected based in part on the capabilities of the device.

9. The method of claim 1, wherein displaying the second image is such that a point in the second image is displayed at a location on the display matching the location on the display of the point in the first image.

10. The method of claim 1, wherein, when the image is a video, displaying the first virtual lens overlaid on the first image further comprises synchronizing a frame rate and currently displayed frame of the first image with a frame rate and currently displayed frame of the second image, and displaying a second virtual lens overlaid on the second image further comprises synchronizing a frame rate and currently displayed frame of the second image with a frame rate and currently displayed frame of the third image.

11. The method of claim 1, further comprising saving the first user indication and the second user indication.

12. The method of claim 11, further comprising redisplaying the second virtual lens containing the third image on the display of the device overlaid on the expanded second image over the first position on based on the saved first and second user indication.

13. The method of claim 1, further comprising:
receiving a third user indication to revert to a previous context; and,
in response to the third user indication, restoring the first image and the first virtual lens containing the second image on the display of the device as displayed prior to receiving the second user indication.

14. The method of claim 1, wherein the size and shape of the second virtual lens match the size and shape of the first virtual lens prior to receiving the second user indication.

15. The method of claim 1, further comprising:
receiving a fourth user indication, wherein the fourth user indication includes an indication of a second position within the expanded second region;
upon receiving the fourth user indication, redisplaying the second virtual lens containing the third image on the display of the device overlaid on the expanded second image over the second position, wherein the third image comprises the third region that includes at least a portion of the expanded second region, at the third resolution level, and wherein the third region includes the second position.

16. The method of claim 15, further comprising:
receiving a fifth user indication to revert to a previous context;
upon receiving the fifth user indication, removing the second virtual lens from the display, and displaying the first virtual lens containing the second image on the display of the device overlaid on the first image over the second position, wherein the second image comprises the second region that includes at least a portion of the first region, at the second resolution level which is higher than the first resolution level, and wherein the second region includes the second position.

17. The method of claim 16, wherein the size of the first virtual lens matches the size of the second virtual lens prior to receiving the fifth user indication.

18. The method of claim 16, wherein the size of the first virtual lens matches its size prior to receiving the second user indication.

19. The method of claim 13, wherein the size of the first virtual lens matches the size of the second virtual lens prior to receiving the third user indication.

20. The method of claim 13, wherein the size of the first virtual lens matches its size prior to receiving the second user indication.

* * * * *